(12) United States Patent
Takei

(10) Patent No.: US 9,899,875 B2
(45) Date of Patent: Feb. 20, 2018

(54) RADIO POWER TRANSMISSION APPARATUS AND RADIO POWER TRANSMISSION SYSTEM

(75) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 14/411,292

(22) PCT Filed: Jun. 26, 2012

(86) PCT No.: PCT/JP2012/066266
§ 371 (c)(1),
(2), (4) Date: Dec. 24, 2014

(87) PCT Pub. No.: WO2014/002190
PCT Pub. Date: Jan. 3, 2014

(65) Prior Publication Data
US 2015/0200568 A1 Jul. 16, 2015

(51) Int. Cl.
*H02J 50/20* (2016.01)
*H02J 17/00* (2006.01)
(Continued)

(52) U.S. Cl.
CPC ............ *H02J 17/00* (2013.01); *B60L 11/182* (2013.01); *B60L 11/1833* (2013.01);
(Continued)

(58) Field of Classification Search
CPC . H02J 5/005; H02J 7/025; H02J 17/00; B60L 11/182
See application file for complete search history.

(56) References Cited

U.S. PATENT DOCUMENTS

| 2011/0049995 A1 | 3/2011 | Hashiguchi |
| 2011/0169337 A1* | 7/2011 | Kozakai .................. H02J 5/005 307/104 |

(Continued)

FOREIGN PATENT DOCUMENTS

| JP | 2007-199871 A | 8/2007 |
| JP | 2010-141977 A | 6/2010 |

(Continued)

OTHER PUBLICATIONS

International Search Report (PCT/ISA/210) dated Jul. 31, 2012 with English-language translation (Four (4) pages).

*Primary Examiner* — Rexford Barnie
*Assistant Examiner* — David Shiao
(74) *Attorney, Agent, or Firm* — Crowell & Moring LLP

(57) ABSTRACT

A radio power transmission apparatus comprises a transmitter 20 having a power transmitting antenna 9 for transmitting electromagnetic waves and a power transmitting circuit and a receiver 40 having a power receiving antenna 29 for receiving electromagnetic waves and a power receiving circuit. In the radio power transmission apparatus, on the basis of power reflected to the power transmitting antenna 9, the power transmitting circuit executes control to change the circuit reactance of the power transmitting circuit in order to control the imaginary part of power of the electromagnetic waves to be transmitted. In addition, on the basis of a value of power transmitted to the transmitter 20 by using electromagnetic waves of power transmission used by the receiver 40 to transmit a value of power received by the receiver 40 through the power receiving antenna 29, the power transmitting circuit executes control to change the circuit reactance of the power transmitting circuit or the characteristic impedance of the power transmitting circuit in order to (Continued)

control the real part of power of the electromagnetic waves to be transmitted.

16 Claims, 19 Drawing Sheets

(51) Int. Cl.
    *H02J 5/00*     (2016.01)
    *H04B 5/00*     (2006.01)
    *B60L 11/18*     (2006.01)
    *H02J 50/80*     (2016.01)
    *H02J 50/40*     (2016.01)
    *H02J 50/50*     (2016.01)

(52) U.S. Cl.
    CPC ....... *B60L 11/1844* (2013.01); *B60L 11/1846* (2013.01); *B60L 11/1861* (2013.01); *B60L 11/1864* (2013.01); *H02J 5/005* (2013.01); *H02J 50/20* (2016.02); *H04B 5/0037* (2013.01); *B60L 2210/30* (2013.01); *B60L 2210/40* (2013.01); *B60L 2230/16* (2013.01); *B60L 2240/70* (2013.01); *H02J 50/40* (2016.02); *H02J 50/50* (2016.02); *H02J 50/80* (2016.02); *Y02E 60/721* (2013.01); *Y02T 10/7005* (2013.01); *Y02T 10/7044* (2013.01); *Y02T 10/7061* (2013.01); *Y02T 10/7088* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2011/0235800 A1 | 9/2011 | Furukawa et al. | |
| 2011/0266880 A1* | 11/2011 | Kim | H02J 7/025 307/104 |
| 2011/0309689 A1* | 12/2011 | Kamata | H02J 5/005 307/104 |
| 2012/0112532 A1* | 5/2012 | Kesler | H03H 7/40 307/9.1 |
| 2012/0200158 A1* | 8/2012 | Takei | H02J 5/005 307/31 |
| 2012/0205988 A1* | 8/2012 | Tanabe | H02J 7/025 307/104 |
| 2012/0286582 A1* | 11/2012 | Kim | H02J 5/005 307/104 |
| 2012/0293118 A1* | 11/2012 | Kim | H02J 5/005 320/108 |
| 2013/0119774 A1* | 5/2013 | Ichikawa | B60L 11/123 307/104 |
| 2013/0300205 A1* | 11/2013 | Tzanidis | H04B 5/0037 307/104 |
| 2015/0085903 A1* | 3/2015 | Gundel | H05K 1/0239 375/219 |

FOREIGN PATENT DOCUMENTS

| | | | | |
|---|---|---|---|---|
| JP | 2011-50140 A | 3/2011 | | |
| JP | 2011-211895 A | 10/2011 | | |
| JP | 2011-259585 A | 12/2011 | | |
| JP | 2012-10546 A | 1/2012 | | |
| JP | 2012-60807 A | 3/2012 | | |
| WO | WO 2011/042974 A1 | 4/2011 | | |
| WO | WO 2011086694 A1 * | 7/2011 | ........... | B60L 11/123 |
| WO | WO 2012/073349 A1 | 6/2012 | | |

\* cited by examiner (a)

(b)

(c)

(a)

(b)

RADIO POWER TRANSMISSION APPARATUS AND RADIO POWER TRANSMISSION SYSTEM

TECHNICAL FIELD

The present invention relates to a radio power transmission apparatus for transmitting power to a remote destination in a non-contact way by using electromagnetic waves. More specifically, the invention relates to a radio power transmission system, image display system, mobile-body power supplying system, radio backup power/information transmission network, radio backup power supplying network that utilize the apparatus.

BACKGROUND ART

The non-contact power transmission can be carried out by using an electromagnetic phenomenon related to magnetic waves. Depending on the relative relation between the positions of the power transmitting side and the power receiving side, a number of methods have been put to practical use.

If the distance between the power transmitting side and the power receiving side is very short, high-efficiency power transmission can be carried out by electromagnetic induction using mainly a magnetic field.

For example, a cooking heater put in a commercial business immediately converts power on the receiving side into a thermal energy at a power-transmission efficiency of greater than 90%.

In addition, power transmission for pass cards used in means of transportation is implemented by electromagnetic induction. When the distance between the pass-card reader and the pass card is very short, high-efficiency power transmission can be carried out.

For a situation in which the relative relation between the positions of the power transmitting side and the power receiving side is not fixed, on the other hand, technologies for transmitting power to remote destinations have also been established in a variety of industrial fields.

For example, an RFID (Radio Frequency IDentification) is one of their examples. At distances ranging from several centimeters to several meters, the RFID is assumed to attenuate at distances between the power transmitting side and the power receiving side by the square of a value obtained by standardizing the distances between the power transmitting side and the power receiving side by the wavelength of electromagnetic waves in use. In this configuration, power transmission can be carried out at an extremely low power transmission efficiency.

In addition, in recent years, there are rising demands for medium-efficiency power transmissions for intermediate distances. Specifications of the medium-efficiency and intermediate-distance power transmissions are different from specifications of the high-efficiency and short-distance and low-efficiency and long-distance power transmissions.

An expected technology for such demands is a transmission method in an electromagnetic field. Referred to as magnetic resonance, the method puts electro and magnetic fields between circuits on the transmitting and receiving sides in order to transmit power in a wireless way. By adoption of this method, energy can be transmitted at an intermediate efficiency over a distance about equal to several times the wavelength.

As described in Patent Documents 1 and 2, in a technology called magnetic resonance, only a magnetic field of an electromagnetic field is used in power transmission. The configuration of the electromagnetic field contributing to the power transmission between the transmitting and receiving sides is an induction field. A disclosed technology is capable of implementing a power transmission efficiency in a range of 40% to 80% by using a non-radiation power transmission configuration, in which the imaginary part of the electromagnetic energy is the main portion, in the distance between the transmitting and receiving sides. In this case, the distance between the transmitting and receiving sides is several meters that equals to several times the wavelength.

In addition, a technology disclosed in Patent Document 3 is used in a condition wherein the power transmission efficiency rises with changes of a distance in power transmission of the magnetic resonance. To transmit power at a highest quantity from a power generating circuit to a load circuit, it is necessary to improve an impedance matching state between a transmitting circuit and a transmitting antenna and an impedance matching state between a receiving circuit and a receiving antenna by inserting a reactance between the transmitting circuit and the transmitting antenna and a reactance between a receiving circuit and a receiving antenna. The technology allows the value of each reactance to be adjusted.

In addition, in a technology disclosed in Patent Document 4, the resistance of a load circuit is changed in order to obtain a maximum power received by a receiving circuit.

It is to be noted that additional explanation is given later to describe the magnetic-resonance power transmission

PRIOR ART DOCUMENTS

Patent Documents

Patent Document 1: JP-2011-259585-A
Patent Document 2: JP-2011-211895-A
Patent Document 3: JP-2012-010546-A
Patent Document 4: JP-2007-199871-A

SUMMARY OF THE INVENTION

Problem to be Solved by the Invention

However, the electromagnetic-induction method for the described cooking heater, the described pass card and the like require that the distance between the power transmitting device and the power receiving device is short in comparison with the wavelength so that the distance can be ignored (e.g. $\frac{1}{10}^6$). If the distance is not that short, the method cannot be adopted.

In addition, in the method using electromagnetic waves in the power transmission, the electromagnetic waves can be transmitted to a remote destination in a remote field in the power transmission. In comparison with electrostatic and induction fields each serving as another element of the electromagnetic waves, however, the power-transmission efficiency is low. Thus, there has been raised a problem that the power-transmission efficiency cannot be increased to a value greater than several percents (%).

In addition, the technologies disclosed in Patent Documents 1 to 4 as technologies each adopting the magnetic-resonance method are each closed in a receiver and a transmitter. These technologies raise a problem that it is impossible to increase the power-transmission efficiency of the power transmission from the transmitter to the receiver to a high value of several tens of percents.

It is thus an object of the present invention for solving the problems described above to provide a radio power transmission apparatus, radio power transmission system, image display system, mobile-body power supplying system, radio backup power/information transmission network, and radio backup power supplying network, which are capable of transmitting power at a high power-transmission efficiency in distances where electric and magnetic fields are effective and order thereof are unignorable if compared with the wavelength.

Means for Solving the Problem

To achieve the object described above, inventions are configured as follows.

The radio power transmission apparatus provided by the present invention comprises a transmitter including a power transmitting antenna for transmitting electro magnetic waves and a power transmitting circuit and a receiver including a power receiving antenna for receiving electro magnetic waves and a power receiving circuit. On the basis of a power reflected to the power transmitting antenna, the power transmitting circuit carries out control of changing the circuit reactance of the power transmitting circuit in order to control the imaginary part of the power of the transmitted electromagnetic waves. By using electromagnetic waves received by the receiver in power transmission of power from the power receiving antenna and on the basis of a value of power transmitted to the transmitter, the power transmitting circuit carries out control of changing the circuit resistance of the power transmitting circuit or the characteristic impedance of the circuit in order to control the real part of the power of the transmitted electromagnetic waves.

In addition, other means is explained in descriptions of embodiments implementing the present invention.

Effects of the Invention

In accordance with the present invention, it is possible to provide a radio power transmission apparatus, radio power transmission system, image display system, mobile-body power supplying system, radio backup power/information transmission network, and radio backup power supplying network, which are capable of transmitting power at a high power-transmission efficiency in distances where electric and magnetic fields are effective and magnetic fields are effective and order thereof are unignorable if compared with the wavelength.

BRIEF DESCRIPTION OF THE DRAWINGS

FIG. 11(a) shows the image display system, FIG. 11(b) shows an image display apparatus, and FIG. 11(c) shows a power transmitting circular polarized-wave antenna, a transmitter variable-reactance circuit, and a transmitter variable-characteristic-impedance conversion circuit;

FIG. 13(a) shows the configurations of the power transmitting antenna and the power receiving antenna, FIG. 13(b) shows the configuration of the transmitter, and FIG. 13(c) shows the configuration of the receiver;

FIG. 14(a) shows the configuration of the transmitter and FIG. 14(b) shows the configuration of the transceiver;

FIG. 15(a) shows the configuration of the transmitter, FIG. 15(b) shows the configuration of the transceiver and FIG. 15(c) shows the configuration of the second transceiver;

FIG. 16(a) shows the configuration of the transmitter, FIG. 16(b) shows the configuration of the transceiver and FIG. 16(c) shows the configuration of the second transceiver;

FIG. 17(a) shows a state in which a power accumulation battery of a first transceiver has been fully charged, FIG. 17(b) shows a state in which half the power accumulated in the power accumulation battery of the first transceiver is being transferred to a second transceiver, FIG. 17(c) shows a state in which power has been again accumulated in the power accumulation battery of the first transceiver, FIG. 17(d) shows a state in which a power accumulation battery of the second transceiver has been fully charged, FIG. 17(e) shows a state in which half the power accumulated in the power accumulation battery of the second transceiver is being transferred to a third transceiver, and FIG. 17(f) shows a state in which power has been again accumulated in the power accumulation battery of the second transceiver;

MODES FOR CARRYING OUT THE INVENTION

Next, embodiments of the present invention are explained by referring to the diagrams as follows.

First Embodiment: Configuration of the Radio Power Transmission Apparatus

As the first embodiment of the present invention, a typical configuration of the radio power transmission apparatus is explained.

Figure 1:
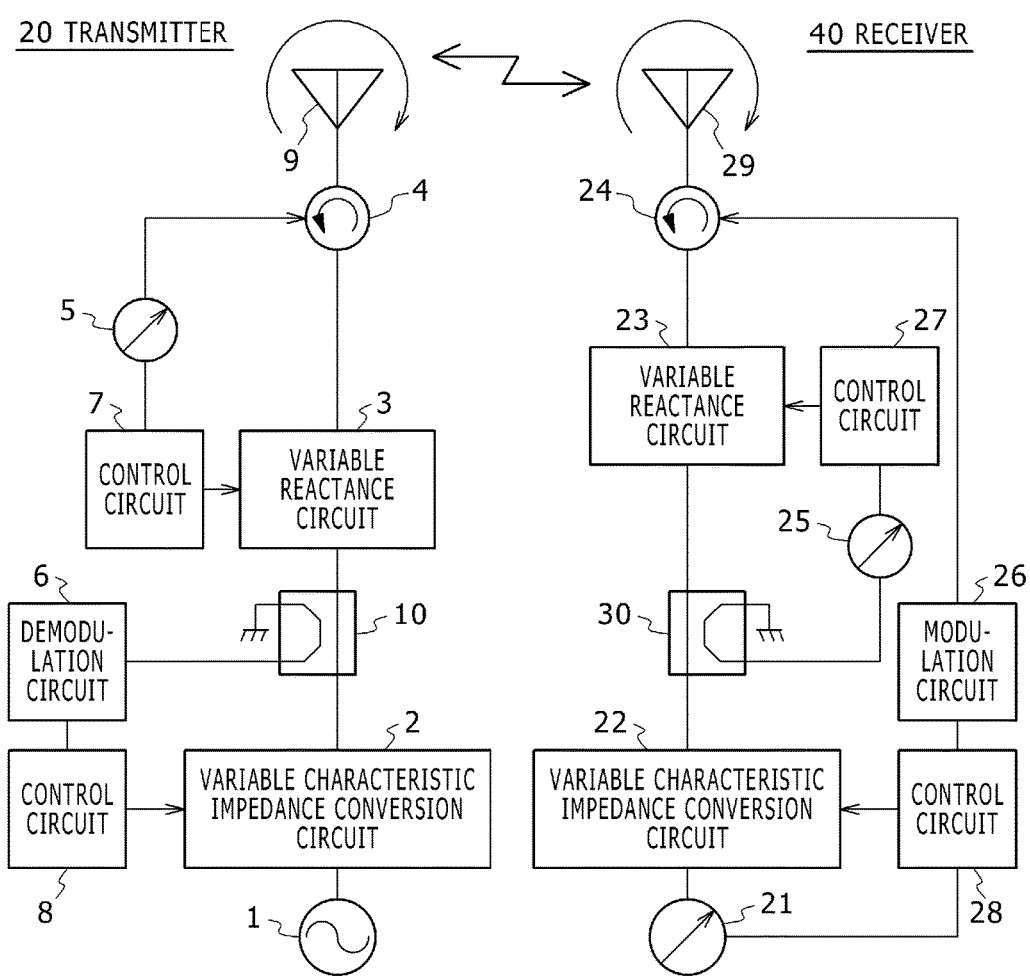
FIG. 1 is a diagram showing a typical configuration of a radio power transmission apparatus according to a first embodiment of the present invention.

FIG. 1 is a diagram showing a typical configuration of a radio power transmission apparatus according to the first embodiment of the present invention.

In FIG. 1, power is transmitted from a transmitter 20 to a receiver 40 in a magnetic resonance state by using electromagnetic waves. A configuration combining the transmitter 20 and the receiver 40 is the radio power transmission apparatus according to the first embodiment.
Transmitter 20

In the transmitter 20, high-frequency power generated by a power generation circuit 1 is radiated to the air by a power transmitting circular polarized-wave antenna 9 through a variable transmitter characteristic impedance conversion circuit (a variable characteristic impedance conversion circuit) 2 and a variable transmitter reactance circuit (a variable reactance circuit) 3.

However, a power transmitting directivity coupler 10 is provided between the variable transmitter characteristic impedance conversion circuit 2 and the variable transmitter reactance circuit 3.

The power transmitting directivity coupler 10 supplies part of power flowing from the variable transmitter reactance circuit 3 to the variable transmitter characteristic impedance conversion circuit 2 to the power transmitting demodulation circuit (a demodulation circuit) 6.

The power transmitting demodulation circuit 6 supplies a demodulated demodulation output from the part of the power to a second transmission control circuit (a control circuit) 8.

The second power transmitting control circuit 8 controls the variable transmitter characteristic impedance conversion circuit 2 in order to change the impedance value of the transmitter 20.

In addition, a power transmitting circulator 4 is provided between the power transmitting circular polarized-wave antenna 9 and the variable transmitter reactance circuit 3.

In addition, the power transmitting circulator 4 transfers the power generated by the power generation circuit 1 from the variable transmitter reactance circuit 3 to the power transmitting circular polarized-wave antenna 9.

In addition, the power transmitting circulator 4 supplies part of power flowing from the power transmitting circular polarized-wave antenna 9 to the power transmitting circulator 4 to a transmitted power measurement circuit 5.

The transmitted power measurement circuit 5 supplies a measurement output measured from the part of the power to a first transmission control circuit (a control circuit) 7.

The first power transmitting control circuit 7 controls the variable transmitter reactance circuit 3 in order to change the reactance value of the transmitter 20.

As described above, the transmitter 20 radiates electromagnetic waves to the air as power from the power transmitting circular polarized-wave antenna 9. In addition, the characteristic-impedance value and the reactance value of the transmitter 20 are controlled. Details of this control will be described later (by referring to a flowchart shown in FIG. 9).

In addition, in FIG. 1, the variable transmitter characteristic impedance conversion circuit 2 is expressed simply as a "variable characteristic impedance conversion circuit." By the same token, the variable transmitter reactance circuit 3 is expressed simply as a "variable reactance circuit," the first power transmitting control circuit 7 is simply expressed as a "control circuit," the second power transmitting control circuit 8 is simply expressed as a "control circuit," and the power transmitting demodulation circuit 6 is simply expressed as a "demodulation circuit."

In addition, in the first embodiment, a circuit configuration comprising the power generation circuit 1, the variable transmitter characteristic impedance conversion circuit 2, the variable transmitter reactance circuit 3, the power transmitting circulator 4, the transmitted power measurement circuit 5, the power transmitting demodulation circuit 6, the first power transmitting control circuit 7, the second power transmitting control circuit 8 and the power transmitting directivity coupler 10 corresponds to a power transmission circuit.
Receiver 40

As shown in FIG. 1, in the receiver 40, power captured (received) by a power receiving circular polarized-wave antenna 29 is transferred to a load circuit 21 through a variable receiver reactance circuit (a variable reactance circuit) 23 and a variable receiver characteristic impedance conversion circuit (a variable characteristic impedance conversion circuit) 22.

However, a power receiving directivity coupler 30 is provided between the variable receiver characteristic impedance conversion circuit 22 and the variable receiver reactance circuit 23.

The power receiving directivity coupler 30 supplies power flowing from the variable receiver reactance circuit 23 to the variable receiver characteristic impedance conversion circuit 22 to a received power measurement circuit 25.

The received power measurement circuit 25 measures the power and supplies a measurement output to a first power receiving control circuit (a control circuit) 27.

The first power receiving control circuit 27 refers to the measurement output of the received power measurement circuit 25 to control the variable receiver reactance circuit (the variable reactance circuit) 23, changing the reactance value of the receiver 40.

In addition, a power receiving modulation circuit (a control circuit) 28 outputs a control signal representing consumed power of the load circuit 21 in order to directly control the variable receiver characteristic impedance conversion circuit 22, changing the characteristic impedance of the receiver 40.

In addition, a power receiving modulation circuit (a modulation circuit) 26 outputs a modulation signal of the consumed power of the load circuit 21 through a second power receiving control circuit 28.

In addition, a power receiving circulator 24 is provided between a power receiving circular polarized-wave antenna 29 and the variable receiver reactance circuit 23.

In addition, the power receiving circulator 24 modulates electromagnetic waves captured by the power receiving circular polarized-wave antenna 29 on the basis of a modulation signal of the power receiving modulation circuit 26.

As described above, the receiver 40 uses the power receiving circular polarized-wave antenna 29 to capture electromagnetic waves from the air as received power and controls the characteristic-impedance and reactance values of the receiver 40. Details of this control will be described later (by referring to a flowchart shown in FIG. 10).

In addition, in FIG. 1, the variable receiver characteristic impedance conversion circuit 22 is simply expressed as a "variable characteristic impedance conversion circuit." By the same token, the variable receiver reactance circuit 23 is simply expressed as a "variable reactance circuit," the first power receiving control circuit 27 is simply expressed as a "control circuit," the second power receiving control circuit 28 is simply expressed as a control circuit and the power receiving modulation circuit 26 is simply expressed as a modulation circuit.

In addition, in the first embodiment, a circuit configuration comprising the load circuit 21, the variable receiver characteristic impedance conversion circuit 22, the variable receiver reactance circuit 23, the power receiving circulator 24, the received power measurement circuit 25, the power receiving modulation circuit 26, the first power receiving control circuit 27, the second power receiving control circuit 28, and the power receiving directivity coupler 30 corresponds to a power receiving circuit.

Other Configurations and Operations of the Transmitter 20 and the Receiver 40

Next, other configurations and operations of the transmitter 20 and the receiver 40 are explained as follows.

It is necessary to decrease the degree of coupling between the power transmitting directivity coupler 10 and the power receiving directivity coupler 30 which are used in the first embodiment to a value which reduces the effect on the efficiency of the power transmission from the transmitter 20 to the receiver 40. For example, a value in a range of −10 dB to −20 dB is used.

In addition, power for circuit elements inside the transmitter 20 is supplied from the power generation circuit 1 whereas power for circuit elements inside the receiver 40 is supplied from the load circuit 21.

To avoid the complicity of the figure, lines for supplying the power to the circuit elements are not shown in the figure.

In accordance with the first embodiment, the imaginary part of the internal impedance of the transmitter 20 corresponds to the variable transmitter reactance circuit 3 and is controlled by power reflected from the power transmitting circular polarized-wave antenna 9.

In addition, the imaginary part of the internal impedance of the receiver 40 corresponds to the variable receiver reactance circuit 23 and is controlled by output power from the power receiving circular polarized-wave antenna 29.

These control operations cause energy to be supplied from the transmitter 20 to the receiver 40. By referring to the supplied energy, the variable receiver characteristic impedance conversion circuit 22 corresponding to the real part of the internal impedance of the variable receiver characteristic impedance conversion circuit 22 can be controlled more directly by the power value of the load circuit 21.

In addition, the real part of the internal impedance of the transmitter 20 corresponds to the variable transmitter characteristic impedance conversion circuit 2. Direct modulation can be carried out by the power receiving modulation circuit 26 receiving power of the load circuit 21 on electromagnetic waves shared by the transmitter 20 and the receiver 40. As a result, after the modulated components appearing on the side of the transmitter 20 have been reproduced by the power transmitting demodulation circuit 6, control can be executed by referring to the power of the modulated components.

Thus, the real and imaginary parts of the internal impedance of each of the transmitter 20 including the power generation circuit 1 and the power transmitting circular polarized-wave antenna 9 and the receiver 40 including the load circuit 21 and the power receiving circular polarized-wave antenna 29 can be controlled concurrently, making it possible to carry out high-efficiency radio power transmission using electromagnetic waves from the transmitter 20 to the receiver 40.

Second Embodiment: Configuration of the Radio Power Transmission Apparatus

Next, a second embodiment of the present invention is explained as follows.

Figure 2:
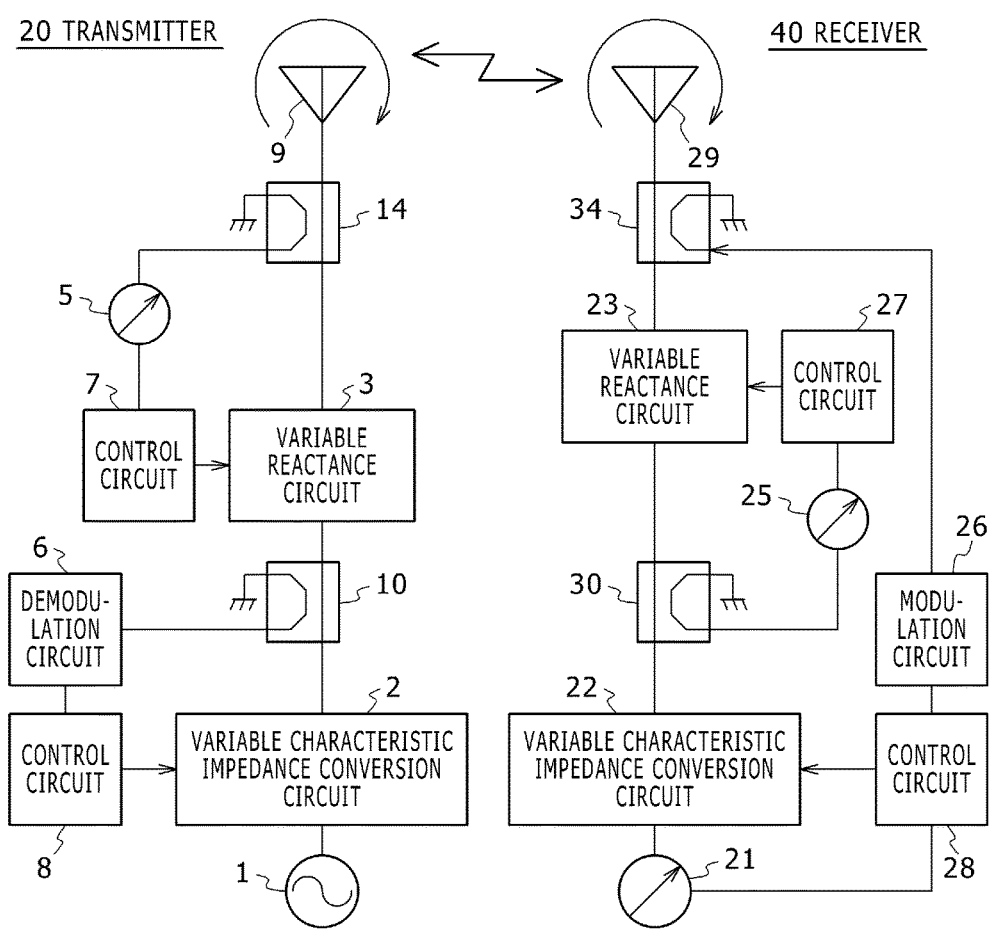
FIG. 2 is a diagram showing a typical configuration of a radio power transmission apparatus according to a second embodiment of the present invention.

FIG. 2 is a diagram showing a typical configuration of a radio power transmission apparatus according to the second embodiment of the present invention.

FIG. 2 is different from FIG. 1 in that, in place of the power transmitting circulator 4 (shown in FIG. 1) and the power receiving circulator 24 (also shown in FIG. 1), a second power transmitting directivity coupler 14 and a second power receiving directivity coupler 34 are used.

It is necessary to decrease the degree of coupling between the second power transmitting directivity coupler 14 and the second power receiving directivity coupler 34 to a value which reduces the effect on the efficiency of the power transmission from the transmitter to the receiver. For example, a value in a range of −10 dB to −20 dB is used.

In accordance with the second embodiment, the directivity coupler of the second power transmitting directivity coupler 14 and the second power receiving directivity coupler 34 is configured from an electrical circuit for selectively detecting transmitted or reflected waves. Thus, the couplers can each be implemented as a planar circuit.

On the other hand, the circulator of the power transmitting circulator 4 and the power receiving circulator 24 used in first embodiment has a cubic structure for selecting a port of signal switching.

Thus, in comparison with the first embodiment using a circulator, the second embodiment using a directivity coupler contributes to size reduction of the radio power transmission apparatus.

In the second embodiment, a circuit configuration comprising the load circuit 21, the variable receiver characteristic impedance conversion circuit 22, the variable receiver reactance circuit 23, the second power receiving directivity coupler 34, the received power measurement circuit 25, the power receiving modulation circuit 26, the first power receiving control circuit 27, the second power receiving control circuit 28, and the power receiving directivity coupler 30 corresponds to a power receiving circuit.

In addition, the other elements are each denoted by a reference numeral common to FIGS. 1 and 2 so that the configurations are also basically identical with each other. Thus, duplication of explanation can be avoided.

Third Embodiment: Configuration of the Radio Power Transmission Apparatus

Next, a third embodiment of the present invention is explained as follows.

Figure 3:
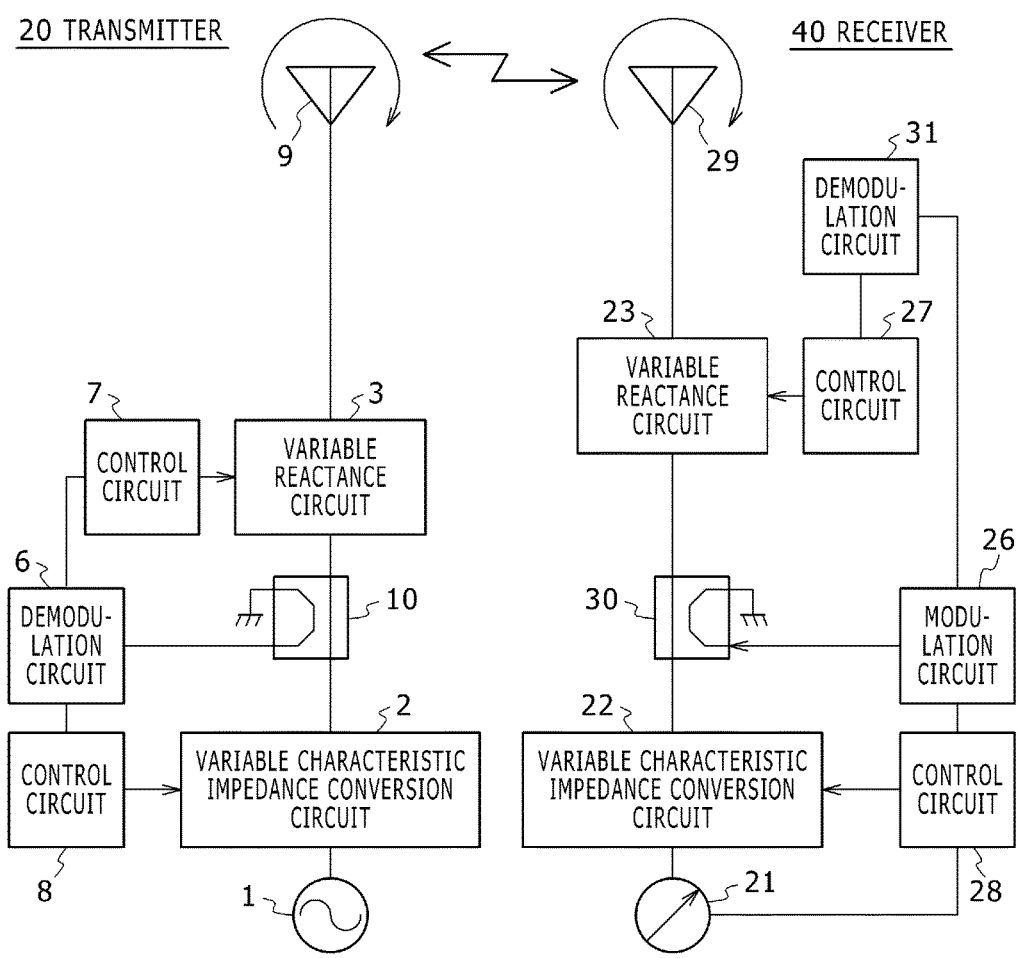
FIG. 3 is a diagram showing a typical configuration of a radio power transmission apparatus according to a third embodiment of the present invention.

FIG. 3 is a diagram showing a typical configuration of a radio power transmission apparatus according to the third embodiment of the present invention.

FIG. 3 is different from FIG. 1 in that omitted elements include the power transmitting circulator 4, the power receiving circulator 24, the transmitted power measurement circuit 5, and the received power measurement circuit 25.

In addition, the added element is a power receiving demodulation circuit 31 (a second demodulation circuit).

In addition, elements are modified as follows. The first power transmitting control circuit 7 for controlling the variable transmitter reactance circuit 3 executes the control by an output signal of the power transmitting demodulation circuit 6 (a first demodulation circuit) and the first power receiving control circuit 27 for controlling the variable receiver reactance circuit 23 executes the control by an output signal of the power receiving modulation circuit 26 through the power receiving demodulation circuit 31.

In the configuration described above, the variable transmitter reactance circuit 3 related to the imaginary part of the internal impedance of the transmitter 20 and the variable transmitter characteristic impedance conversion circuit 2 related to the real part of the internal impedance are both controlled on the basis of a signal of the power transmitting demodulation circuit 6.

In addition, the variable receiver reactance circuit 23 related to the imaginary part of the internal impedance of the receiver 40 and the variable receiver characteristic impedance conversion circuit 22 related to the real part of the internal impedance are both controlled on the basis of a signal of the power receiving modulation circuit 26.

The other elements are each denoted by a reference numeral common to FIGS. 1 and 3 so that the configurations are also basically identical with each other. Thus, duplication of explanation can be avoided.

In the third embodiment, the transmitter 20 and the receiver 40 cannot individually execute control of the imaginary part of the internal impedance. Thus, from the beginning, it is necessary to set the initial values of the variable transmitter reactance circuit 3 and the variable receiver reactance circuit 23 of the transmitter 20 and the receiver 40 from the transmitter 20 to the receiver 40 so that power transmission of a certain degree can be carried out.

If the positions of the transmitter 20 and the receiver 40 are fixed so that there are no big changes of the environment surrounding the positions, the setting of such initial values is practically possible.

In accordance with the third embodiment shown in FIG. 3, the internal circulators (reference numerals 4 and 24 in FIG. 1) of the transmitter 20 and the receiver 40 and the power measurement circuits (reference numerals 5 and 25 in FIG. 1) of the transmitter 20 and the receiver 40 are omitted. Thus, there is a big effect on efforts to simplify the radio power transmission apparatus and reduce the size of the apparatus. In addition, the imaginary and real parts of the internal impedances of the transmitter 20 and the receiver 40 can be controlled by using the same signal. Thus, there is a big effect on efforts to simplify the control algorithm.

Fourth Embodiment: Configuration of the Radio Power Transmission Apparatus

Next, a fourth embodiment of the present invention is explained as follows.

Figure 4:
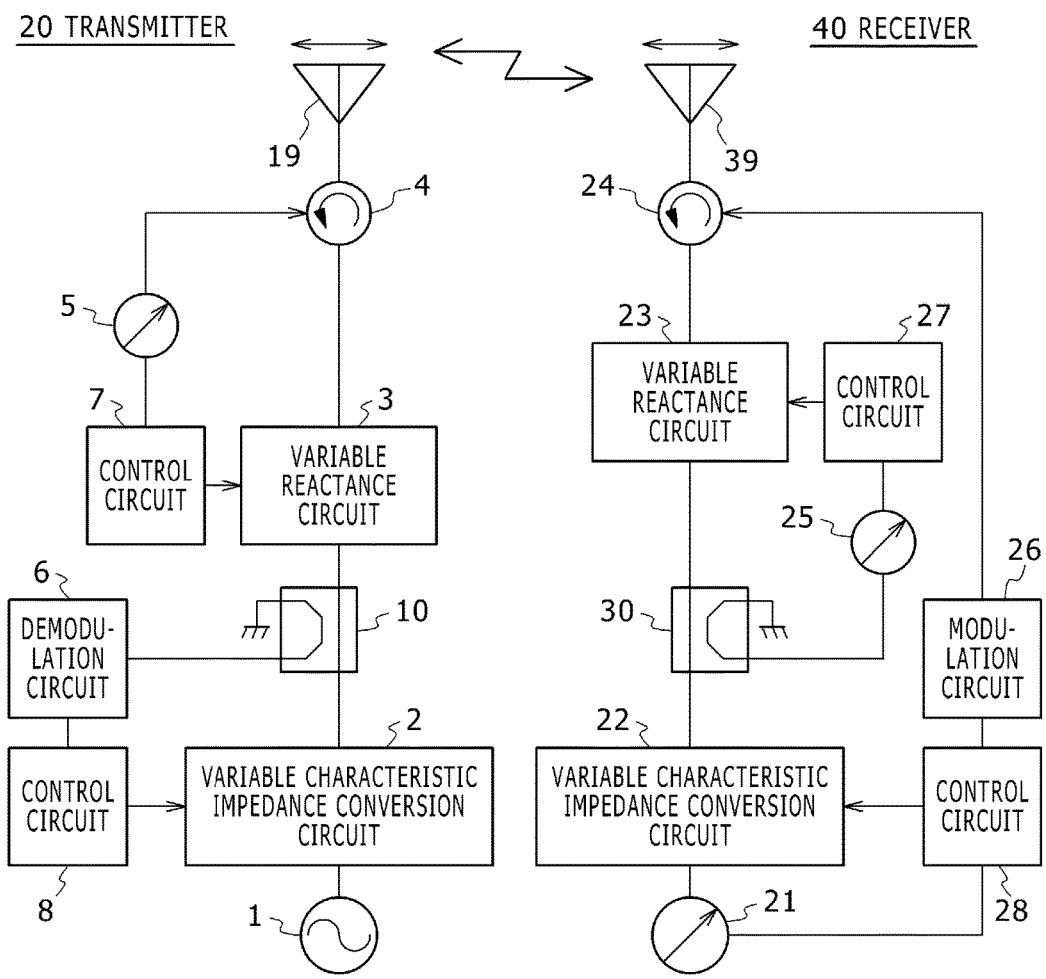
FIG. 4 is a diagram showing a typical configuration of a radio power transmission apparatus according to a fourth embodiment of the present invention.

FIG. 4 is a diagram showing a typical configuration of a radio power transmission apparatus according to the fourth embodiment of the present invention.

FIG. 4 is different from FIG. 1 in that, in place of the power transmitting circular polarized-wave antenna 9 (shown in FIG. 1) and the power receiving circular polarized-wave antenna 29 (also shown in FIG. 1), a power transmitting linear polarized-wave antenna 19 and a power receiving linear polarized-wave antenna 39 are used in the fourth embodiment.

In accordance with the fourth embodiment, essentially, in comparison with the circular polarized-wave antennas (reference numerals 9 and 29 in FIG. 1), the linear polarized-wave antennas (reference numerals 19 and 39 in FIG. 4) have a one-dimensional structure. Thus, in an environment allowing opposed setting of the power transmitting antenna and the power receiving antenna seen as opposite antennas, the fourth embodiment rather has an effect on reduction of the dimensions of the antennas employed in the radio power transmission apparatus.

The other elements are each denoted by a reference numeral common to FIGS. 1 and 4 so that the configurations are also basically identical with each other. Thus, duplication of explanation can be avoided.

Fifth Embodiment: Configuration of the Radio Power Transmission Apparatus

Next, a fifth embodiment of the present invention is explained as follows.

Figure 5:
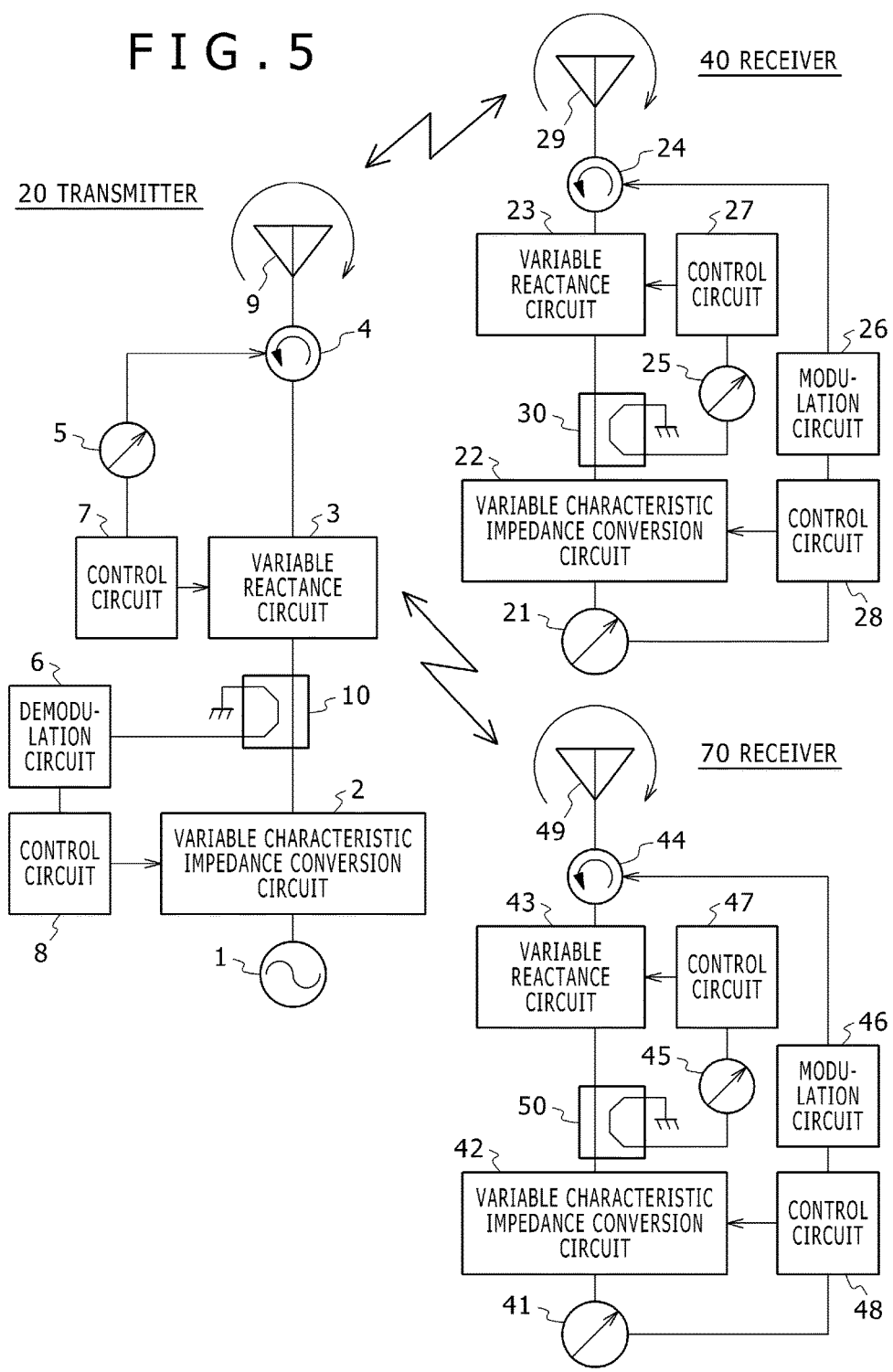
FIG. 5 is a diagram showing a typical configuration of a radio power transmission apparatus according to a fifth embodiment of the present invention.

FIG. 5 is a diagram showing a typical configuration of a radio power transmission apparatus according to the fifth embodiment of the present invention.

FIG. 5 is different from FIG. 1 in that two receivers (receivers 40 and 70) exist for one transmitter 20. In general, a plurality of receivers may exist, and here FIG. 5 shows a configuration including only two receivers.

The receiver 70 newly added as a second receiver has a configuration identical with the receiver 40. Reference numerals 41 to 50 denoting circuits composing the receiver 70 correspond to reference numerals 21 to 30 denoting respectively or sequentially corresponding circuits composing the receiver 40. Thus, even though the circuits are denoted by reference numerals different from those of the corresponding circuits, the circuits have essentially the same configurations as the corresponding circuits. Therefore, it is possible to eliminate duplications of explanations of the configuration of the receiver 70 and circuit elements of the configuration.

In the fifth embodiment, in the same way as the first embodiment shown in FIG. 1, the real and imaginary parts of the internal impedance of each of the transmitter 20, the receiver 40 and the receiver 70 which are included in the fifth embodiment are controlled concurrently, making it possible to carry out high-efficiency radio power transmission using electromagnetic waves from the transmitter 20 to the receiver 40 and the receiver 70.

The circuit configurations of the transmitter 20 and the receiver 70 are high-frequency configurations identical with each other. Thus, in the first embodiment shown in FIG. 1, if the structures of the power transmitting circular polarized-wave antenna 9 and the power receiving circular polarized-wave antenna 29 are identical with each other, resonance occurs, making it possible to implement the high-efficiency power transmission. In this case, the real and imaginary parts of the internal impedances of the transmitter 20 and the receiver 70 are equal to or approximately equal to each other.

In the fifth embodiment shown in FIG. 5, however, two receivers (40 and 70) exist so that the fifth embodiment is not identical with the first embodiment shown in FIG. 1. Even though the resonance frequency of the transmitter 20 is not changed, it is necessary to increase the power transmission capability of the transmitter 20. Thus, the dimensions of the power transmitting antenna are relatively increased and the dimensions of the power receiving antenna are reduced so that it is possible to divide the power transmitted by the transmitter among a plurality of receivers.

In addition, if the position of the transmitter 20 is approximately opposite to the positions of the receiver 40 and the receiver 70, and the positions of the receiver 40 and the receiver 70 are such that the receiver 40 and the receiver 70 approximately intersect each other at right angles, interferences between the receiver 40 and the receiver 70 decrease. In this case, the radio power transmission can be carried out with a high degree of efficiency.

In this way, by configuring the transmitter 20 so that the number of receivers 40 can be increased, it is possible to raise the degree of freedom in the system design of a power transmission system using the radio power transmission apparatus according to the present embodiment.

Sixth Embodiment: Configuration of the Radio Power Transmission Apparatus

Next, a sixth embodiment of the present invention is explained as follows.

Figure 6:
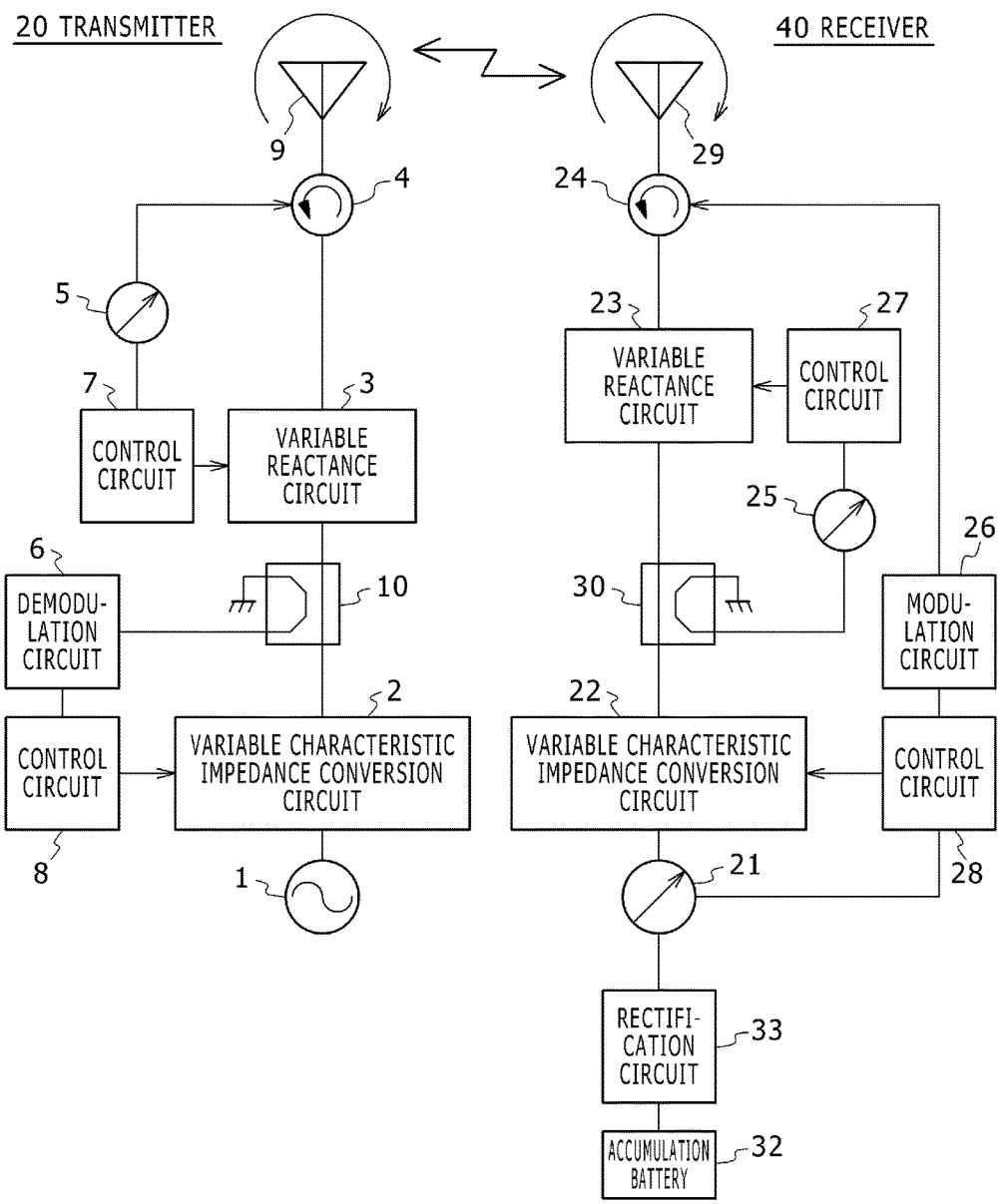
FIG. 6 is a diagram showing a typical configuration of a radio power transmission apparatus according to a sixth embodiment of the present invention.

FIG. 6 is a diagram showing a typical configuration of a radio power transmission apparatus according to the sixth embodiment of the present invention.

FIG. 6 is different from FIG. 1 in that the receiver 40 is provided with a rectification circuit 33 and a power accumulation battery 32. Thus, the rectification circuit 33 and the power accumulation battery 32 are connected to each other in series to the load circuit 21.

The other elements are each denoted by a reference numeral common to FIGS. 1 and 6 so that the configurations are also basically identical with each other. Thus, duplication of explanation can be avoided.

In accordance with the sixth embodiment, power received by the receiver 40 can be accumulated in the power accumulation battery 32. Thus, operations of the receiver 40 can be implemented by the power accumulated in the power accumulation battery 32. The operations of the receiver 40 are operations carried out by the first power receiving control circuit 27, the second power receiving control circuit 28, the variable receiver reactance circuit 23, the variable receiver characteristic impedance conversion circuit 22 and the power receiving modulation circuit 26 which compose the receiver 40. Thus, it is possible to increase the efficiency of the power transmission from the transmitter 20 to the receiver 40. In addition, there is an effect of shortening a period between a time immediately after the power transmission and a high-efficiency power transmission state.

Seventh Embodiment: Configuration of the Radio Power Transmission Apparatus

Next, a seventh embodiment of the present invention is explained as follows.

Figure 7:
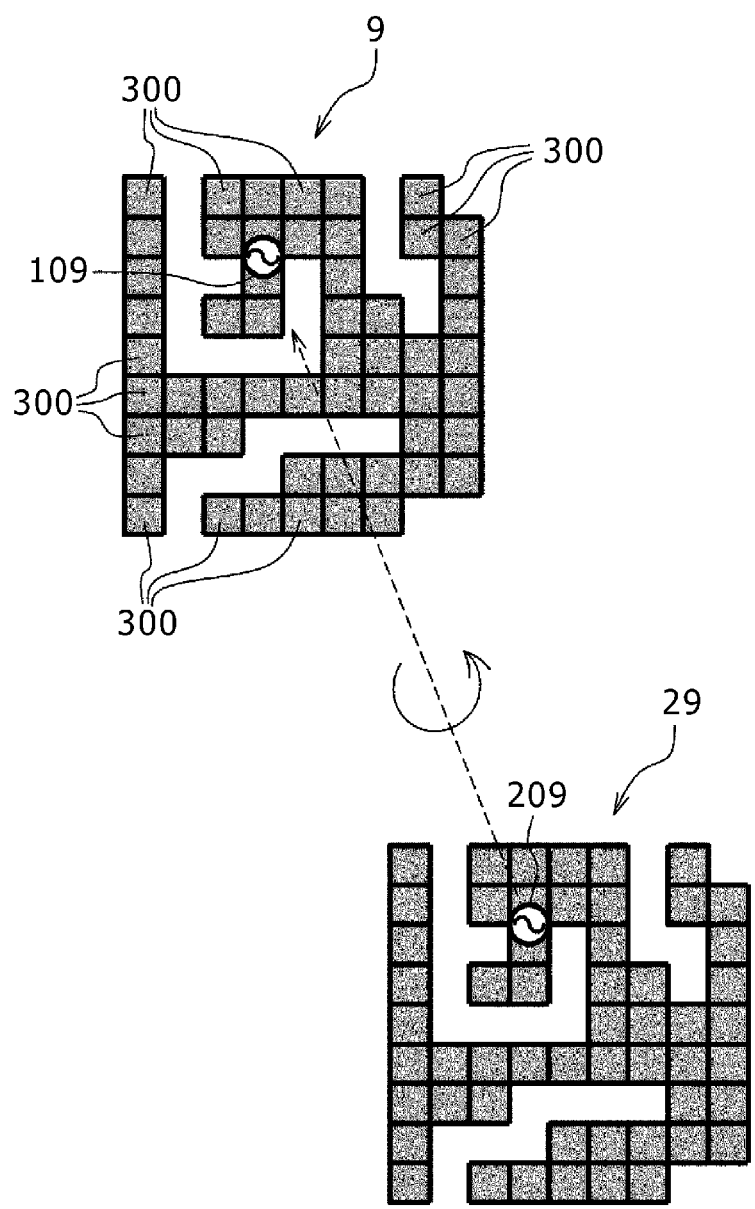
FIG. 7 is a diagram showing a typical structure of a power transmitting circular polarized-wave antenna and a power receiving circular polarized-wave antenna which are provided in accordance with a seventh embodiment of the present invention.

FIG. 7 is a diagram showing a typical configuration of a power transmitting circular polarized-wave antenna and a power receiving circular polarized-wave antenna according to the seventh embodiment of the present invention.

In FIG. 7, the power transmitting circular polarized-wave antenna 9 is formed by assembling a plurality of small rectangular conductors 300 into a predetermined set. In addition, a power supplying point (a transmitting antenna supplying point) 109 is provided inside the set of the small rectangular conductors 300.

In addition, in the same way as the power transmitting circular polarized-wave antenna 9, the power receiving circular polarized-wave antenna 29 is formed by assembling a plurality of small rectangular conductors 300 into a set. In addition, a power supplying point (a receiving antenna supplying point) 209 is provided inside the set of the small rectangular conductors 300.

To provide the power receiving circular polarized-wave antenna 29 with the same characteristic as the power transmitting circular polarized-wave antenna 9 so that the power receiving circular polarized-wave antenna 29 can easily enter a state of resonance with the power transmitting circular polarized-wave antenna 9, the power receiving circular polarized-wave antenna 29 is formed to have the same configuration and the same structure as the power transmitting circular polarized-wave antenna 9.

In FIG. 7, reference numeral 300 at a small rectangular conductor 300 is used to denote some small rectangular conductors placed outside. However, reference numeral 300 does not denote all small rectangular conductors. Any other conductors having the same form as the small rectangular, including small rectangular conductors placed inside, correspond to the small rectangular conductor mentioned above, even if reference numerals 300 are not denoted.

In the first embodiment, as described before, the power transmitting circular polarized-wave antenna 9 and the power receiving circular polarized-wave antenna 29 which are used in the radio power transmission apparatus according to an embodiment of the present invention are required to have a predetermined sensitivity for an electric field and a magnetic field. It is thus desirable that the power transmitting circular polarized-wave antenna 9 and the power receiving circular polarized-wave antenna 29 have the characteristics of both an opposite planar structure effective for generation of an electric field and a round line structure effective for generation of a magnetic field.

As one of means for obtaining such a structure, the antenna is formed into a planar structure to implement an antenna structure by a set of small rectangular conductors. The combination is changed in a round-robin manner into one with and without the small rectangular conductors.

Then, any portions of the small rectangular conductors are selected in a round-robin manner to be used as 2 power supplying points. In this way, a structure showing a predetermined antenna characteristic is selected.

In accordance with this method, the power transmitting circular polarized-wave antenna 9 and the power receiving circular polarized-wave antenna 29 which are used in the radio power transmission apparatus according to an embodiment of the present invention are designed.

The typical design shown in FIG. 7 is a model of a typical case in which the number of small rectangular conductors is 10×10. In FIG. 7, from a relation between compartment division lines and compartment rectangles, the number of small rectangular conductors can be seen as 9×9. In the following description, however, the number of small rectangular conductors is taken as 10×10.

In this case, the number of candidates for the antenna structure having a shape that can be taken by the small rectangular conductors has a maximum value of a 200th power of 2 if a study is carried out in a round-robin manner. In addition, for each structure, the number of candidates for the positions of two sets of power supplying points has a maximum value of second power of $(2\times 90)\cdot(2\times 90-1)/2!$.

The total number of combinations of the antenna structure verified in a round-robin manner and the positions of the power supplying points is a product of both and is thus very large. By using computer hardware developed very fast in recent years, however, the electromagnetic field can be computed in order to sequentially compute and compare self impedances and mutual impedances in the combinations.

By adoption of a high-speed computation algorithm of the electromagnetic field computation, it is possible to design an antenna having a fine structure comprising many rectangular conductors. By carrying out both the high-efficiency power transmission and the stable control signal transmission, a good antenna structure can be discovered.

Eighth Embodiment: Control Algorithms of the Transmitter and the Receiver

Next, as an eighth embodiment of the present invention, the following description explains control algorithms of the transmitter 20, and the receiver 40 which are used for the high-efficiency power transmission.

Figure 8:
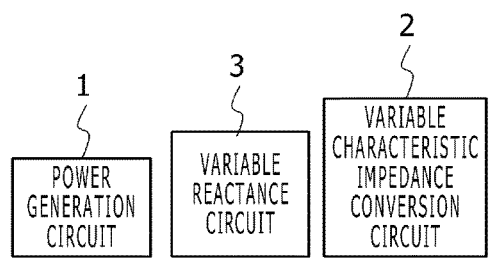
FIG. 8 shows time charts of typical operations carried out by configuration elements to explain a control algorithm adopted by a transmitter and a receiver which are employed in a radio power transmission apparatus according to an eighth embodiment of the present invention to perform power transmission at a high efficiency.
Figure 8:
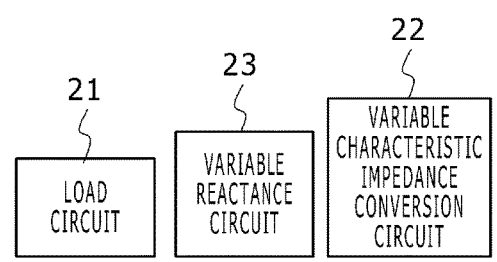
Figure 8:
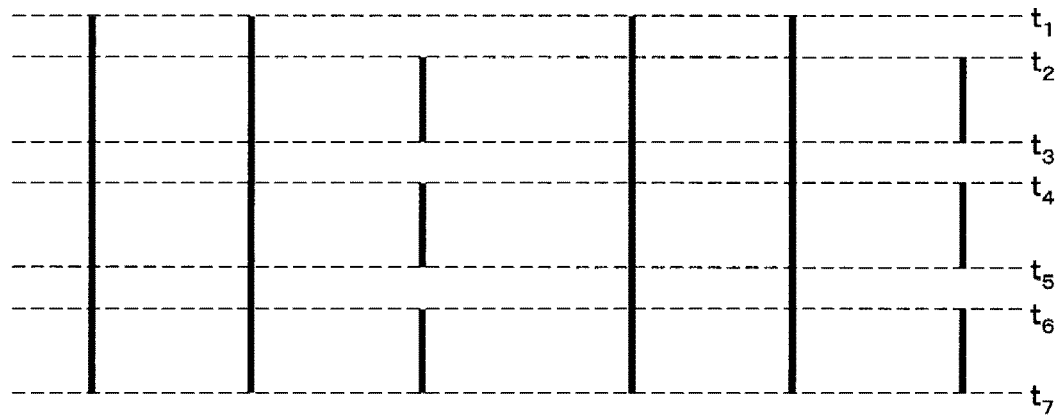
Figure 8:
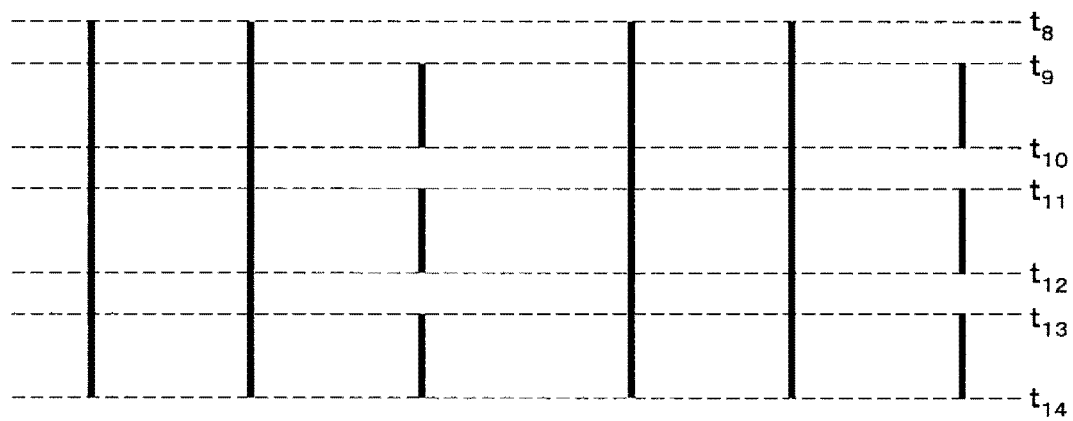

FIG. 8 shows time charts of typical operations carried out by configuration elements to explain a control algorithm adopted by a transmitter and a receiver which are employed in a radio power transmission apparatus according to an eighth embodiment of the present invention to perform power transmission at a high efficiency.

To be more specific, FIG. 8 shows time charts of typical operations carried out by the power generation circuit 1, the variable transmitter reactance circuit 3 and the variable transmitter characteristic impedance conversion circuit 2 which form the transmitter 20 shown in FIG. 1 and time charts of typical operations carried out by the load circuit 21, the variable receiver reactance circuit 23, and the variable receiver characteristic impedance conversion circuit 22 which form the receiver 40 shown in FIG. 1.

The vertical direction is the direction of the lapse of time.

When an operation to generate power of the power generation circuit 1 inside the transmitter 20 is started, control of the variable transmitter reactance circuit 3 is started (at a time t1).

As indicated in explanation of details in a latter supplement, the control of the variable transmitter reactance circuit 3 is carried out so that the energy of the imaginary part of power of electromagnetic waves exists locally in the power transmitting circular polarized-wave antenna (reference numeral 9 in FIG. 1) and the power receiving circular polarized-wave antenna (reference numeral 29 in FIG. 1). Thus, the control is executed to dynamically implement conjugate matching at power supplying points (reference numerals 109 and 209 in FIG. 7) of the power transmitting circular polarized-wave antenna 9 and the power receiving circular polarized-wave antenna 29.

Therefore, in a state wherein the transmitter 20 and the receiver 40 have been placed, an initial state is established in advance so that the conjugate matching can be obtained by the power supplying points 109 and 209 of the power transmitting circular polarized-wave antenna 9 and the power receiving circular polarized-wave antenna 29. By establishing such an initial point in advance, power transmission carried out to a certain degree from the transmitter 20 to the receiver 40 can be expected.

As a result, power is generated in the load circuit 21 of the receiver 40 without a long delay and, at the same time, the control of the variable receiver reactance circuit 23 can also be started (at about the time t1).

Subsequently, the control of the variable transmitter reactance circuit 3 employed in the transmitter 20 and the variable receiver reactance circuit 23 employed in the receiver 40 is continued (t1 to t2).

Then, at a stage of implementing control of a state of the imaginary parts of the internal impedances of the transmitter 20 and the receiver 40, control of the real parts of the internal impedances of the transmitter 20 and the receiver 40 is started by the variable transmitter characteristic impedance conversion circuit 2 and the variable receiver characteristic impedance conversion circuit 22 (at a time t2).

As the control of the real part of the internal impedance of the receiver 40 is started by the variable receiver characteristic impedance conversion circuit 22, modulation is re-executed on electromagnetic waves for the power transmission from the transmitter 20 to the receiver 40.

On the basis of this modulation, control of the variable transmitter characteristic impedance conversion circuit 2 employed in the transmitter 20 is also started without a delay (at about a time t2).

The control of the real parts of the internal impedances of the transmitter 20 and the receiver 40 is control accompanying energy spreading to an external space. Since it is control for which absolute convergence is not guaranteed, the control is once terminated when a certain prescribed time has lapsed (at a time t3).

After a predetermined time has lapsed since the termination of the control of the real parts of the internal impedances of the transmitter 20 and the receiver 40, the control of the real parts of the internal impedances of the transmitter 20 and the receiver 40 is restarted (at a time t4).

The operations from the time t1 to the time t4 are repeated (t5, t6 and t7).

When power transmission by the transmitter 20 is finished, a power supply for supplying power to circuit elements of the transmitter 20 and the receiver 40 is lost. Thus, the entire control is ended (at a time t7).

The power transmission by the transmitter 20 is again started (at a time t8).

When the power transmission is started, the same operations are repeated (t8 to t14).

As described above, in accordance with the eighth embodiment, it is possible to simultaneously execute 2 different kinds of control. In this way, the 2 kinds of control are established. In one control, absolute convergence can be expected since power is localized (imaginary part). In the other control, power is spread (real part) so that absolute convergence is not guaranteed.

Ninth Embodiment: Control Algorithm of the Transmitter

Next, a ninth embodiment of the present invention is explained. The ninth embodiment is an embodiment implementing a control algorithm of the transmitter used in the radio power transmission apparatus according to first to eighth embodiments to carry out high-efficiency power transmission.

Figure 9:
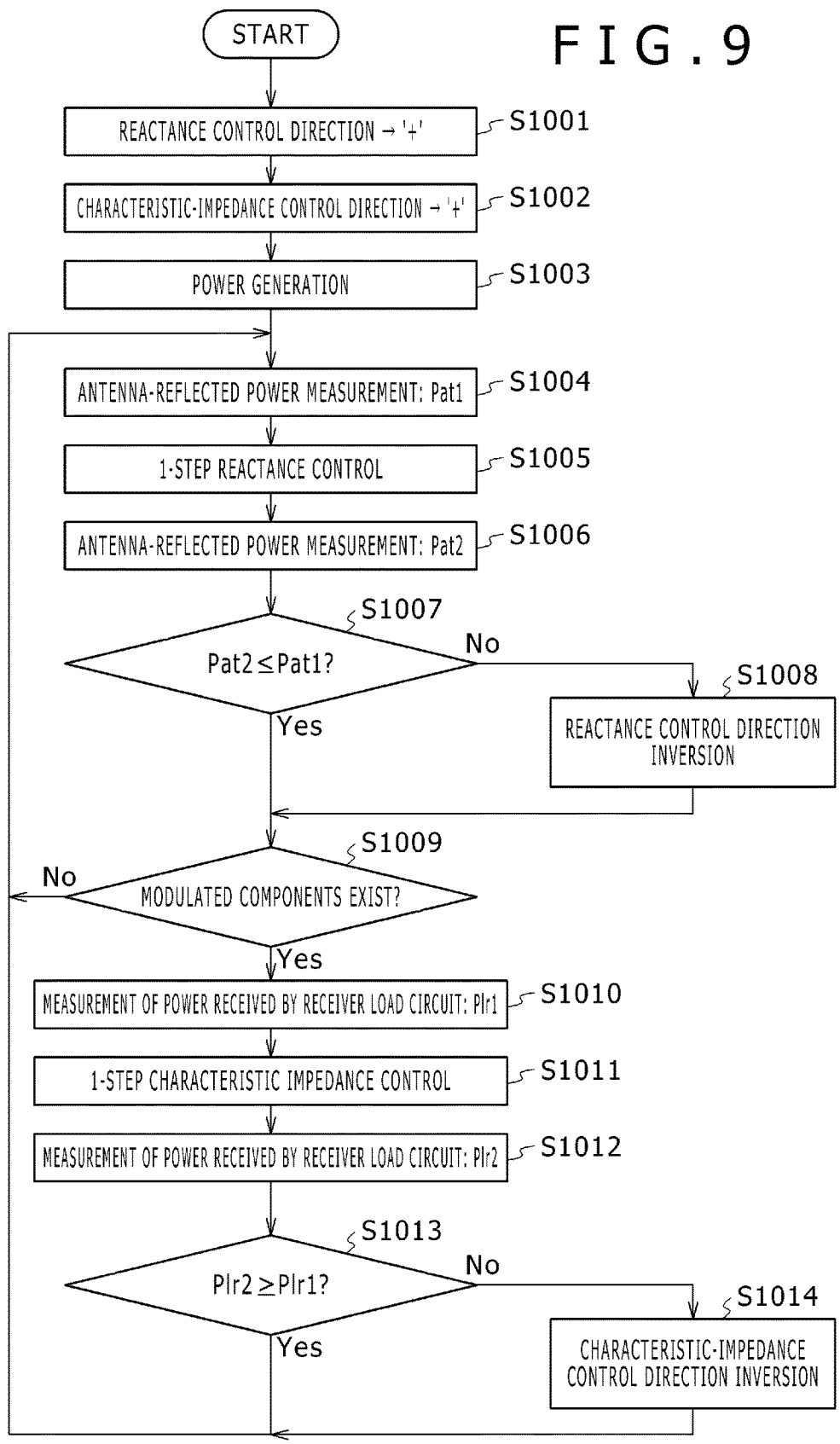
FIG. 9 shows a flowchart explaining a typical control algorithm adopted by a transmitter employed in a radio power transmission apparatus according to a ninth embodiment of the present invention.

FIG. 9 shows a flowchart explaining a typical control algorithm adopted by a transmitter employed in a radio power transmission apparatus according to a ninth embodiment of the present invention.

Outline of the Control Algorithm of the Transmitter

An outline of a flowchart shown in FIG. 9 is explained as follows. Details of each step in the flowchart will be described later.

In the control algorithm of the transmitter according to the ninth embodiment, as a preparation for starting power transmission, the transmitter 20 (shown in FIG. 1) sets initial values in advance. The transmitter 20 sets initial values increasing or decreasing values of the variable transmitter reactance circuit 3 (shown in FIG. 1) and the variable transmitter characteristic impedance conversion circuit 2 (shown in FIG. 1).

When power is generated in the power generation circuit 1 (shown in FIG. 1), the power is referred to in order to increase or decrease the reactance value of the variable transmitter reactance circuit 3. Thus, power reflected from the power transmitting circular polarized-wave antenna 9 (shown in FIG. 1) is once measured and the reactance value is changed in accordance with the set increasing/decreasing direction.

After the reactance value has been changed, the power reflected by the power transmitting circular polarized-wave antenna 9 is measured and an increase or a decrease of the reflected power is verified. If the reflected power has increased, the direction to change the reactance value is inverted.

Then, electromagnetic waves used in the power transmission are examined to verify whether a modulated component exists in the waves. If a modulated component exists in the waves, the modulated component is demodulated and power consumed by the load circuit 21 (shown in FIG. 1) of the receiver 40 (shown in FIG. 1) is measured.

Afterward, the conversion value of the variable transmitter characteristic impedance conversion circuit 2 is changed in accordance with the set increasing or decreasing direction.

The power consumed by the load circuit 21 of the post-change receiver 40 is measured and the measured power is examined. If the consumed power has decreased, the direction to change the conversion value of the variable transmitter characteristic impedance conversion circuit 2 is inverted.

Then, the flow of the flowchart again returns to the control of the variable transmitter reactance circuit 3.

In accordance with the control algorithm provided by the ninth embodiment, the control of the imaginary and real parts of the internal impedance of the transmitter 20 can be concretely executed by using the variable transmitter reactance circuit 3 and the variable transmitter characteristic impedance conversion circuit 2.

Details of the Flowchart of the Control Algorithm of the Transmitter

The following description explains details of the flowchart in FIG. 9, which shows the control algorithm of the transmitter. Steps of the flowchart are explained sequentially as follows.

S1001

At a step S1001, as a preparation in advance for starting power transmission, the transmitter 20 sets an initial value (for example, a value on the + side) increasing or decreasing the value of the variable transmitter reactance circuit 3 (shown in FIG. 1).

In FIG. 9, the step S1001 is described as "Reactance control direction→'+'."

Then, the flow goes on to a step S1002.

S1002

At the step S1002, as a preparation in advance for starting power transmission, the transmitter 20 sets an initial value (for example, a value on the + side). The transmitter 20 sets the initial value which is a value increasing or decreasing the value of the variable transmitter characteristic impedance conversion circuit 2 (shown in FIG. 1).

In FIG. 9, the step S1002 is described as "Characteristic-impedance control direction→'+'."

Then, the flow goes on to a step S1003.

S1003

At the step S1003, power is generated in the power generation circuit 1 (shown in FIG. 1). That is to say, power generation is carried out. In FIG. 9, the step S1003 is described as "Power generation."

Then, the flow goes on to a step S1004.

S1004

At the step S1004, power (Pat1) generated at the step S1003 and reflected by the antenna is measured.

In FIG. 9, the step S1004 is described as "Antenna-reflected power measurement: Pat1."

Then, the flow goes on to a step S1005.

S1005

At the step S1005, on the basis of a result of the measurement carried out at the step S1004 to measure the reflected power (Pat1), the reactance value is changed by 1 step of a predetermined value in accordance with the set increasing/decreasing direction. The reactance value is a conversion value of the variable reactance circuit (the variable transmitter reactance circuit) 3 obtained by the measurement.

In FIG. 9, the step S1005 is described as "1-step reactance control."

Then, the flow goes on to a step S1006.

S1006

At the step S1006, power reflected by the antenna, whose reactance value has been changed at the step S1005, is measured again (Pat2).

In FIG. 9, the step S1006 is described as "Antenna-reflected power measurement: Pat2."

Then, the flow goes on to a step S1007.

S1007

At the step S1007, the reflected power (Pat2) measured at the step S1006 is compared with the reflected power (Pat1) measured at the step S1004 to determine whether the reflected power (Pat2) is smaller than or equal to the reflected power (Pat1).

If the reflected power (Pat2) is smaller than or equal to the reflected power (Pat1) (Yes in the step S1007), the flow goes on to a step S1009.

If the reflected power (Pat2) has become greater than the power (Pat1) (No in the step S1007), on the other hand, the flow goes on to a step S1008.

In FIG. 9, the step S1007 is described as "Pat2≤Pat1?."

S1008

At the step S1008, the direction of control to increase or decrease the reactance value is inverted for the following reason. At the comparison carried out at the step S1007, the reflected power is found to have increased. In this case, the reactance-value adjustment carried out at the step S1005 is determined to have been undesirable.

In FIG. 9, the step S1008 is described as "Reactance control direction inversion."

Then, the flow goes on to the step S1009.

S1009

At the step S1009, electromagnetic waves used in the power transmission are examined to determine whether the waves include modulated components (a modulated signal).

If modulated components exist in the waves (Yes in the step S1009), the flow goes on to a step S1010.

If modulated components do not exist in the waves (No in the step S1009), the flow goes back the step S1004 to again measure the reflected power and adjust the reactance.

In FIG. 9, the step S1009 is described as "Modulated components exist?."

S1010

At the step S1010, the modulated components of the electromagnetic waves used in the power transmission are demodulated in order to measure power (Plr1) consumed by the load circuit 21 of the receiver 40. The power consumed by the load circuit 21 is also generally power (Plr1) received by the receiver 40 as well. Thus, the power consumed by the load circuit 21 of the receiver 40 is described as "received power" in some cases.

In addition, in FIG. 9, the step S1010 is described as "Measurement of power received by receiver load circuit: Plr1."

Then, the flow goes on to a step S1011.

S1011

At the step S1011, on the basis of a result of measuring the received power (Plr1) at the step S1010, the characteristic-impedance value is changed by 1 step of a predetermined value in accordance with the set increasing/decreasing direction. The characteristic-impedance value is the conversion value of the variable characteristic impedance conversion circuit 2 (a variable transmitter characteristic impedance conversion circuit) obtained by the measurement.

In FIG. 9, the step S1011 is described as "1-step characteristic impedance control."

Then, the flow goes on to a step S1012.

S1012

At the step S1012, after the characteristic-impedance value has been changed at the step S1011, the power (received power or Plr2) consumed by the load circuit 21 of the receiver 40 is measured again.

In FIG. 9, the step S1012 is described as "Measurement of power received by receiver load circuit: Plr2."

Then, the flow goes on to a step S1013.

S1013

At the step S1013, the reflected power (Plr2) measured at the step S1012 is compared with the received power (Plr1) measured at the step S1010 to determine whether the received power (Plr2) is greater than or equal to the reflected power (Plr1).

If the received power (Plr2) is greater than or equal to the reflected power (Plr1) (Yes in the step S1013), the flow goes back to the step S1004 to again control the variable reactance circuit.

If the reflected power (Plr2) is smaller than the power (Plr1) (No in the step S1013), the flow goes on to a step S1014.

In FIG. 9, the step S1013 is described as "Plr2≥Plr1?."

S1014

At the step S1014, the direction of control to increase or decrease the characteristic-impedance value is inverted for the following reason. At the comparison carried out at the step S1013 to determine whether the received power has increased or decreased, the received power is found to have increased. In this case, the characteristic-impedance value adjustment carried out at the step S1011 is determined to have been undesirable.

In FIG. 9, the step S1014 is described as "Characteristic-impedance control direction inversion."

Then, the flow goes back to the step S1004 to again control the variable reactance circuit 3.

As described above, the flow goes back from the step S1013 or S1014 to the step S1004 to again control the variable reactance circuit 3. This flow is repeated subsequently. This is because it is quite within the bounds of possibility that the position of the receiver 40 has changed and the environment in which the electromagnetic waves are transmitted has changed so that the optimum internal impedance of the transmitter 20 also has changed as well. Thus, the flow is executed repeatedly to always keep up with these changes.

As described above, in accordance with the control algorithm of the transmitter 20 according to the embodiment, the control of the imaginary and real parts of the internal impedance of the transmitter 20 can be concretely carried out by using the variable transmitter reactance circuit 3 and the variable transmitter characteristic impedance conversion circuit 2.

Tenth Embodiment: Control Algorithm of the Receiver

Next, a tenth embodiment of the present invention is explained. The tenth embodiment is an embodiment implementing a control algorithm of the receiver used in the radio power transmission apparatus according to first to eighth embodiments to carry out high-efficiency power transmission.

Figure 10:
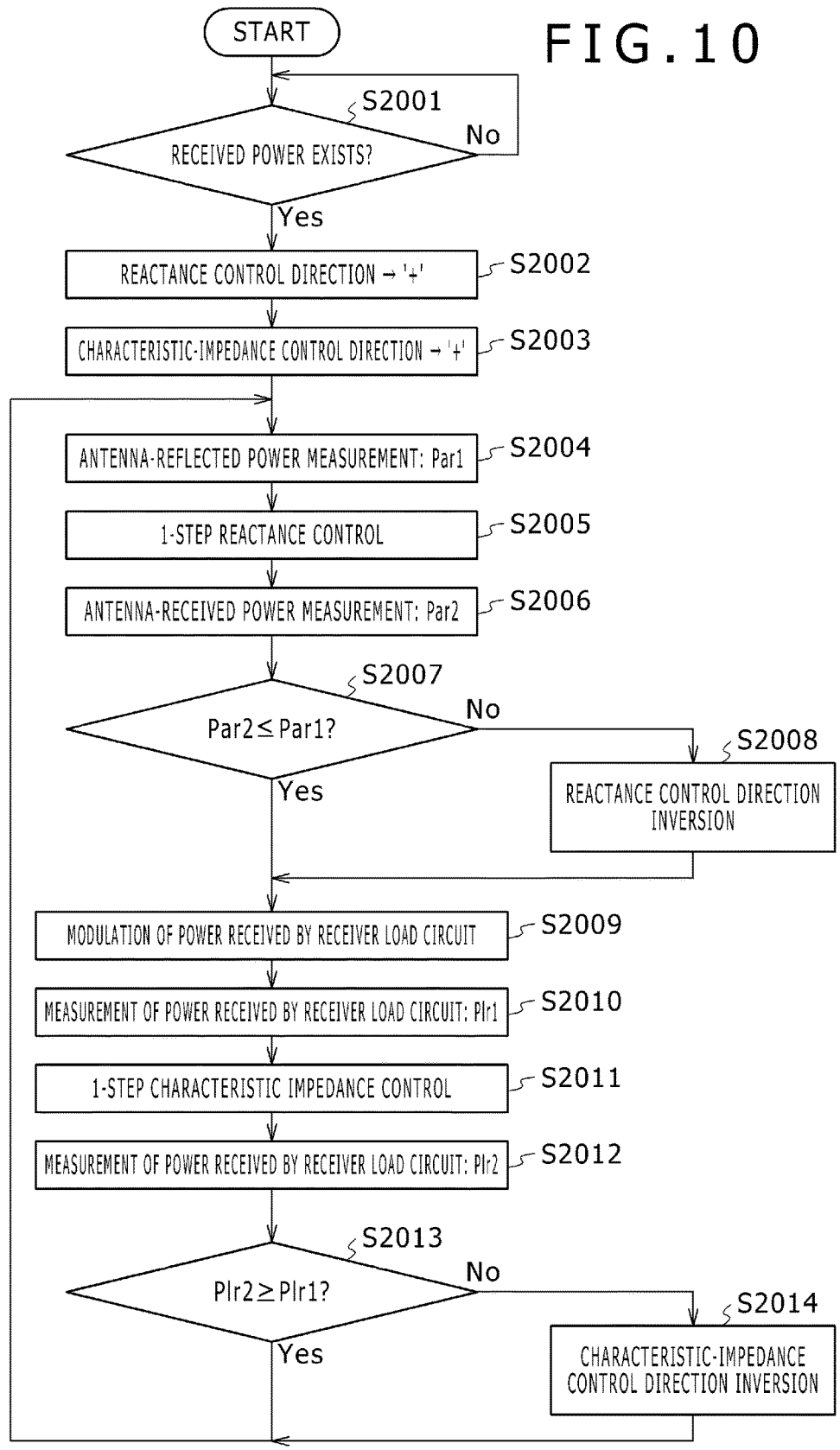
FIG. 10 shows a flowchart explaining a typical control algorithm adopted by a receiver employed in a radio power transmission apparatus according to a tenth embodiment of the present invention.

FIG. 10 shows a flowchart explaining a typical control algorithm adopted by a receiver employed in a radio power transmission apparatus according to a tenth embodiment of the present invention.

Outline of the Control Algorithm of the Receiver

An outline of a flowchart shown in FIG. 10 is explained as follows. Details of each step in the flowchart will be described later.

In the control algorithm adopted by a receiver according to the tenth embodiment, first of all, the receiver automatically determines whether power is received. If no power is received, power cannot be supplied to circuits employed in the receiver 40 to serve as circuits related to control.

As a preparation in advance to start operations to receive power, the receiver 40 sets initial values of the directions to increase or decrease the values of the variable receiver reactance circuit 23 and the variable receiver characteristic impedance conversion circuit 22.

When the load circuit 21 receives power, the power is used to increase or decrease the reactance value of the variable receiver reactance circuit 23. Thus, power received from the antenna 29 is once measured and the reactance value is changed in accordance with the set increasing/decreasing direction.

After the change, power received from the antenna 29 is measured in order to examine whether the received power has increased or decreased. If the received power has decreased, the direction to change the reactance value is inverted.

Then, power received by the load circuit 21 is measured and the measured value is referred to in an operation to directly modulate the electromagnetic waves used in the power transmission between the transmitter 20 and the receiver 40.

Then, the electromagnetic waves used in the power transmission are examined in order to determine whether modulated components exist in the waves. If modulated components exist in the waves, the modulated components are demodulated in order to measure power consumed by the load circuit 21 of the receiver 40.

Afterwards, the conversion value of the variable receiver characteristic impedance conversion circuit 22 is changed in accordance with the set increasing/decreasing direction.

Power consumed by the load circuit 21 of the receiver 40 after the change is measured in order to determine whether the power has increased or decreased. If the consumed power has decreased, the direction to change the conversion value of the variable receiver characteristic impedance conversion circuit 22 is inverted. Then, the flow again goes back to the control of the variable receiver reactance circuit 23.

In accordance with the control algorithm of the receiver 40 according to the tenth embodiment, the control of the imaginary and real parts of the internal impedance of the receiver 40 can be concretely carried out by using the variable receiver reactance circuit 23 and the variable receiver characteristic impedance conversion circuit 22.

Details of the Flowchart of the Control Algorithm of the Receiver

Steps shown in FIG. 10 as steps of the control algorithm of the receiver 40 are explained sequentially as follows.

S2001

At a step S2001, first of all, the receiver 40 automatically determines whether received power exists.

If received power exists (Yes in the step S2001), the flow goes on to a step S2002.

If received power does not exist (No in the step S2001), the flow goes back to the beginning of the step S2001.

If received power does not exist, no power can be supplied to circuits included in the receiver 40 to serve as circuits related to the control of the receiver 40.

In addition, in FIG. 10, the step S2001 is described as "Received power exists?"

S2002

At the step S2002, as a preparation in advance for starting an operation to receive power, first of all, the receiver 40 sets an initial value (for example, on the + side) increasing or decreasing the value of the variable reactance circuit (the variable receiver reactance circuit) 23.

In FIG. 10, the step S2002 is described as "Reactance control direction→'+'."

Then, the flow goes on to a step S2003.

S2003

At the step S2003, as a preparation in advance for starting an operation to receive power, the receiver 40 sets an initial value (for example, on the + side) increasing or decreasing the value of the variable receiver characteristic impedance circuit (the variable receiver characteristic impedance conversion circuit) 22.

In FIG. 10, the step S2003 is described as "Characteristic-impedance control direction→'+'."

Then, the flow goes on to a step S2004.

S2004

At the step S2004, power (Par1) received by the power receiving antenna 29 (shown in FIG. 1) is measured.

In FIG. 9, the step S2004 is described as "Antenna-received power measurement: Par1."

Then, the flow goes on to a step S2005.

At the step S2005, on the basis of a result of the measurement carried out at the step S2004 to measure the received power (Par1), the reactance value is changed by 1 step of a predetermined value in accordance with the set increasing/decreasing direction. The reactance value is a conversion value of the variable receiver reactance circuit 23 (the variable reactance circuit 23) obtained by the measurement.

In FIG. 10, the step S2005 is described as "1-step reactance control."

Then, the flow goes on to a step S2006.

S2006

At the step S2006, after the reactance value has been changed at the step S2005, power (Par2) received by the power receiving antenna 29 is measured again.

In FIG. 10, the step S2006 is described as "Antenna-received power measurement: Par2."

Then, the flow goes on to a step S2007.

S2007

At the step S2007, the received power (Par2) measured at the step S2006 is compared with the received power (Par1) measured at the step S2004 to determine whether the received power (Par2) is greater than or equal to the received power (Par1).

If the received power (Par2) is greater than or equal to the received power (Par1) (Yes in the step S2007), the flow goes on to a step S2009.

If the received power (Par2) has become smaller than the power (Par1) (No in the step S2007), the flow goes on to a step S2008.

In FIG. 10, the step S2007 is described as "Par2 Part?."

S2008

At the step S2008, the direction of control to increase or decrease the reactance value is inverted for the following reason. At the comparison carried out at the step S2007, the received power is found to have decreased. In this case, the reactance-value adjustment carried out at the step S2005 is determined to have been undesirable.

In FIG. 10, the step S2008 is described as "Reactance control direction inversion."

Then, the flow goes on to the step S2009.

S2009

At the step S2009, power consumed by the load circuit 21, corresponds to the real part of the received power, is measured. Then, the measured power is referred to in order to directly modulate electromagnetic waves used in the power transmission from the transmitter 20 to the receiver 40.

In FIG. 10, the step S2009 is described as "Modulation of power received by receiver load circuit."

Then, the flow goes on to a step S2010.

S2010

At the step S2010, the electromagnetic waves used in the power transmission are examined to determine whether modulated components exist in the waves and the existence of such components is verified. Thus, this signal is demodulated in order to measure power consumed by the load circuit 21 of the receiver 40. As described before, the power consumed by the load circuit 21 is also generally power (Plr1) received by the receiver 40 as well.

In FIG. 10, the step S2010 is described as "Measurement of power received by receiver load circuit: Plr1."

Then, the flow goes on to a step S2011.

S2011

At the step S2011, on the basis of a result of measuring the received power (Plr1) at the step S2010, the characteristic-impedance value is changed by 1 step of a predetermined value in accordance with the set increasing/decreasing direction. The characteristic-impedance value is the conversion value of the variable receiver characteristic impedance conversion circuit 22 obtained by the measurement.

In FIG. 10, the step S2011 is described as "1-step characteristic impedance control."

Then, the flow goes on to a step S2012.

S2012

At the step S2012, after the characteristic-impedance value has been changed at the step S2011, the power (received power or Plr2) consumed by the load circuit 21 of the receiver 40 is measured again.

In FIG. 10, the step S2012 is described as "Measurement of power received by receiver load circuit: Plr2."

Then, the flow goes on to a step S2013.

S2013

At the step S2013, the reflected power (Plr2) measured at the step S2012 is compared with the received power (Plr1) measured at the step S2010 to determine whether the received power (Plr2) is greater than or equal to the reflected power (Plr1).

If the received power (Plr2) is greater than or equal to the reflected power (Plr1) (Yes in the step S2013), the flow goes back to the step S2004 to again control the variable reactance circuit.

If the reflected power (Plr2) is smaller than the power (Plr1) (No in the step S2013), the flow goes on to a step S2014.

In FIG. 9, the step S2013 is described as "Plr2≥Plr1?."

S2014

At the step S2014, the direction of control to increase or decrease the characteristic-impedance value is inverted for the following reason. At the comparison carried out at the step S2013 to determine whether the received power has increased or decreased, the received power (Plr2) is found to have increased. In this case, the characteristic0impedance-value adjustment carried out at the step S2011 is determined to have been undesirable.

In FIG. 10, the step S2014 is described as "Characteristic-impedance control direction inversion."

Then, the flow goes back to the step S2004 to again control the variable reactance circuit 23.

As described above, the flow goes back from the step S2013 or S2014 to the step S2004 to again control the variable reactance circuit 23. This flow is repeated subsequently. This is because it is quite within the bounds of possibility that the position of the receiver 40 has changed and the environment in which the electromagnetic waves are transmitted has changed so that the optimum internal impedance of the receiver 40 also has changed as well. Thus, the flow is executed repeatedly to always keep up with these changes.

As described above, in accordance with the control algorithm of the receiver 40 according to the embodiment, the control of the imaginary and real parts of the internal impedance of the receiver 40 can be concretely carried out by using the variable receiver reactance circuit 23 and the variable receiver characteristic impedance conversion circuit 22.

Eleventh Embodiment: Configuration of the Image Display System

Next, an eleventh embodiment of the present invention is explained as follows.

Figure 11:
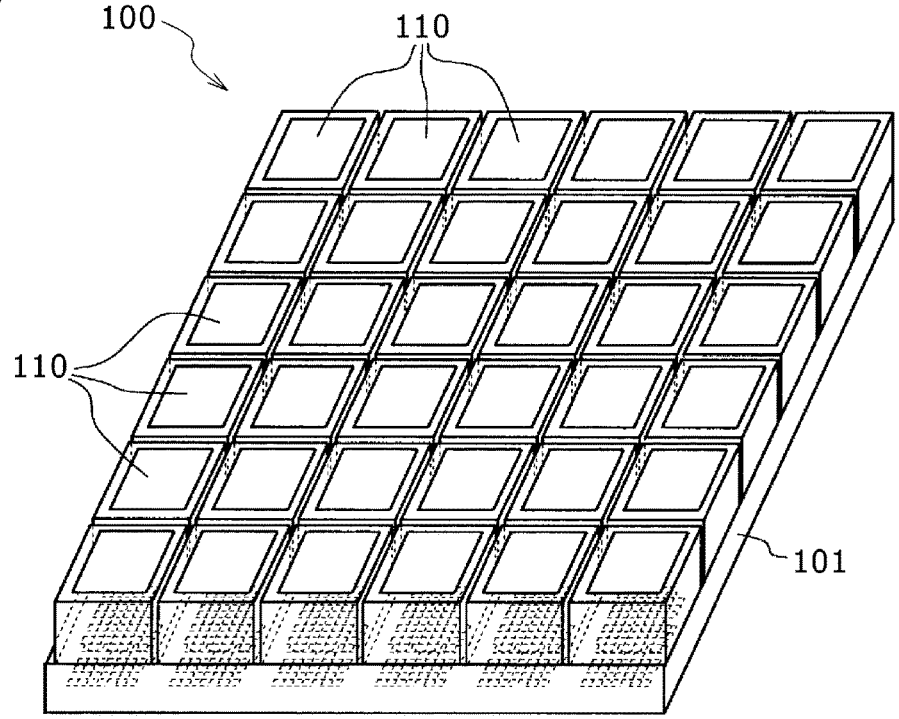
FIG. 11 is a diagram showing a typical configuration of an image display system using a radio power transmission apparatus according to an eleventh embodiment of the present invention.
Figure 11:
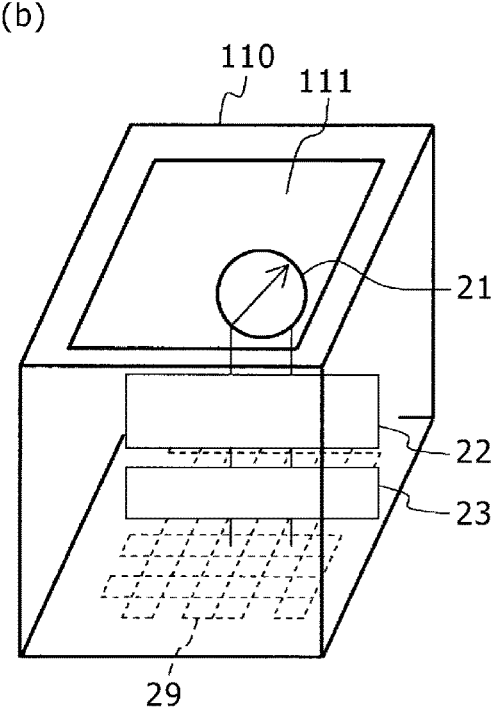
Figure 11:
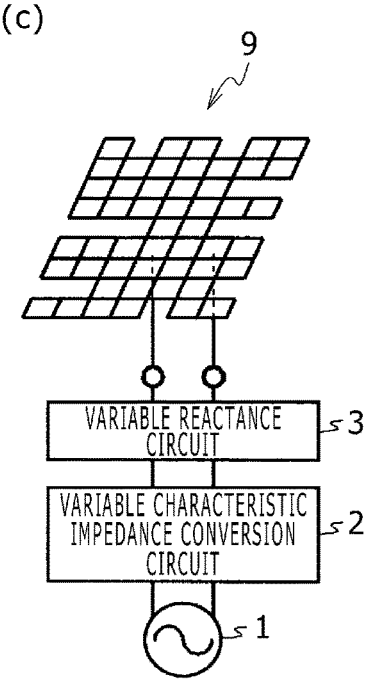

FIG. 11 is a diagram showing a typical configuration of an image display system using a radio power transmission apparatus according to an eleventh embodiment of the present invention and FIG. 11(a) shows the image display system 100. FIG. 11(b) shows an image display apparatus 110 and FIG. 11(c) shows a power transmitting circular polarized-wave antenna 9, a transmitter variable-reactance circuit 3, and a transmitter variable-characteristic-impedance conversion circuit 2.

In FIG. 11(a), the image display system 100 is configured to comprise a plurality of image display apparatus 110 laid out to form a matrix and a single radio power supplying apparatus 101.

In FIG. 11(b), the image display apparatus 110 comprises a display 111 on the upper surface and a power receiving circular polarized-wave antenna 29 on the lower surface.

In addition, the receivers (20) according to the first to fifth embodiments are linked to the power receiving circular polarized-wave antenna 29 and supplies power for operating the display 111.

In FIG. 11(b), configuration elements of the receiver (shown in FIG. 1) other than the variable receiver reactance circuit 23, the variable receiver characteristic impedance conversion circuit 22, and the load circuit 21 are omitted.

In addition, in FIG. 11(c), power is supplied to the power transmitting circular polarized-wave antenna 9 through the power generation circuit 1, the variable transmitter characteristic impedance conversion circuit 2, and the variable transmitter reactance circuit 3 which are included in the transmitter 20 (shown in FIG. 1).

In FIG. 11(c), configuration elements of the transmitter 20 (shown in FIG. 1) other than the variable transmitter reactance circuit 3, the variable transmitter characteristic impedance conversion circuit 2, and the power generation circuit 1 are omitted.

In FIG. 11(a), in the radio power supplying apparatus 101, a plurality of power transmitting circular polarized-wave antennas 9 are laid out on the upper surface to form a plane. Such power transmitting circular polarized-wave antennas 9 are linked to the transmitter 20 according to the first to fifth embodiments, making it possible to supply remote power to the image display apparatus 110.

Data of the image display is transmitted by adoption of a method not requiring lines such as a radio-LAN method.

In accordance with the eleventh embodiment, power-supply lines are not required. Thus, the single image display apparatus can be laid out with a full degree of freedom so that, as a whole, an image display system having a large screen can be configured.

Accordingly, when positioning the single image display apparatus composing pixels of the image display apparatus 110, the lines described above are not required. Thus, it is possible to substantially reduce the number of man-hours required for installing the apparatus for displaying an image on a large screen. As a result, there is provided an effect of improving the safety in the installation of the apparatus by eliminating causes such as broken wires and short circuits.

Twelfth Embodiment: Mobile-Body Power Supplying System

The following description explains a twelfth embodiment of the present invention. This embodiment is a mobile-body power supplying system using a radio power transmission apparatus.

Figure 12:
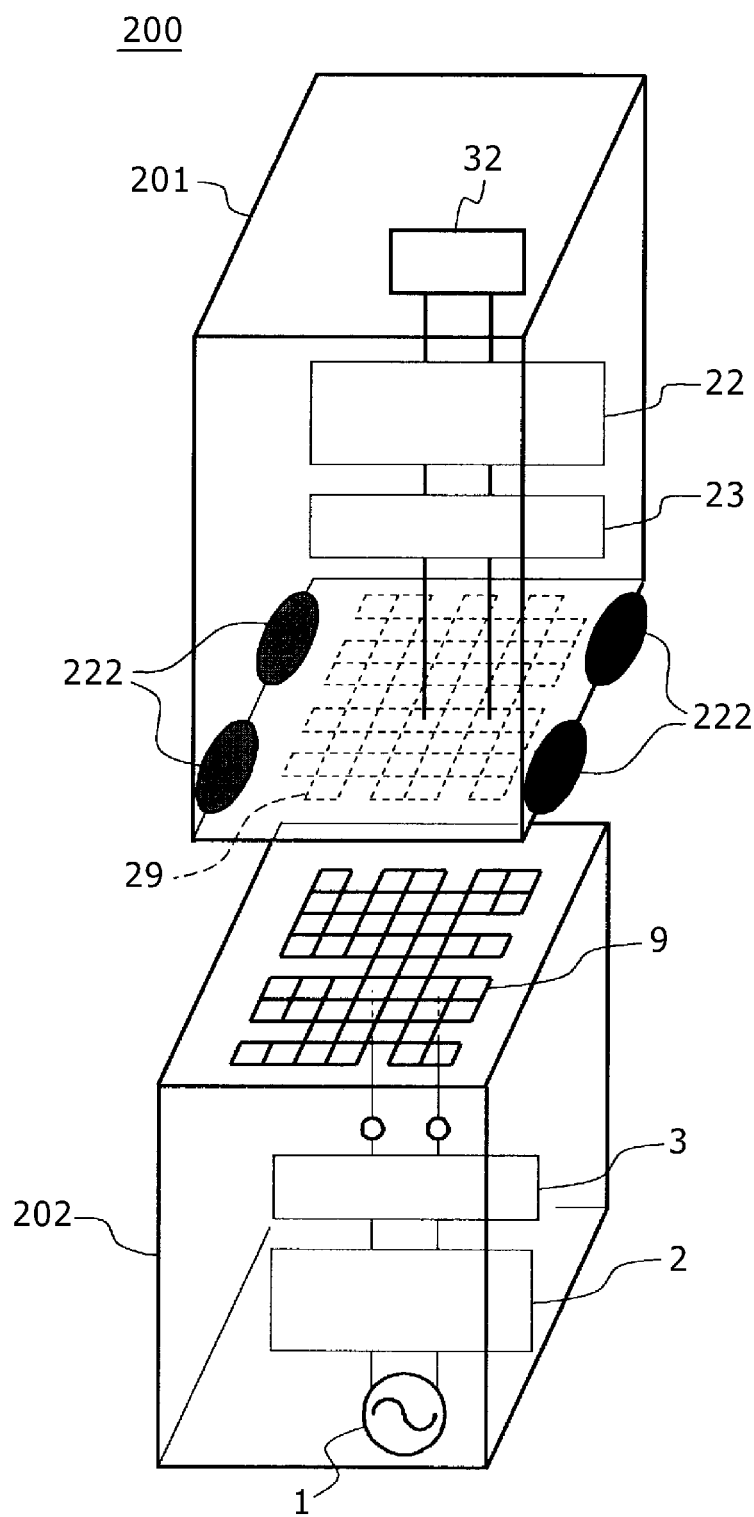
FIG. 12 is a diagram showing a typical configuration of a mobile-body power supplying system using a radio power transmission apparatus according to a twelfth embodiment of the present invention.

FIG. 12 is a diagram showing a typical configuration of a mobile-body power supplying system using a radio power transmission apparatus according to a twelfth embodiment of the present invention.

In FIG. 12, the mobile-body power supplying system 200 is configured to comprise a mobile body 201 and a radio power supplying apparatus 202.

The mobile body 201 can be moved by a vehicle wheel 222. The mobile body 201 is provided with a power receiving circular polarized-wave antenna 29 on the lower surface.

The power receiving circular polarized-wave antenna 29 is connected to the receiver 40 provided by the sixth embodiment (shown in FIG. 6) on the lower surface to supply power to the mobile body 201.

In FIG. 12, configuration elements of the receiver 40 other than the variable receiver reactance circuit 23, the variable receiver characteristic impedance conversion circuit 22, and the power accumulation battery 32 are omitted.

The radio power supplying apparatus 202 has a power transmitting circular polarized-wave antenna 9 on the upper surface. The power transmitting circular polarized-wave antenna 9 is connected to a transmitter according to any of the first to fifth embodiments in order to provide power to the mobile body 201 from a remote location.

In FIG. 12, configuration elements of the transmitter (20) other than the variable transmitter reactance circuit 3, the variable transmitter characteristic impedance conversion circuit 2, the power generation circuit 1, and the power transmitting circular polarized-wave antenna 9 are omitted.

In accordance with the twelfth embodiment, when required, the mobile body 201 can be moved to a position above the radio power supplying apparatus 202 in order to charge power from a power supply.

Thus, lines for supplying power to the mobile body 201 are not required so that connection hardware for the lines can be eliminated. As a result, the hardware of the system can be simplified. In addition, it is quite within the bounds of possibility that unsafe potentials such as broken lines and short circuits are generated in an electrical line section. Thus, there is provided an effect of enhancing the safety of the system.

Thirteenth Embodiment: First Other Typical Configurations of the Radio Power Transmission Apparatus Next, a thirteenth embodiment of the present invention is explained. The thirteenth embodiment also carries out radio power transmissions.

Figure 13:
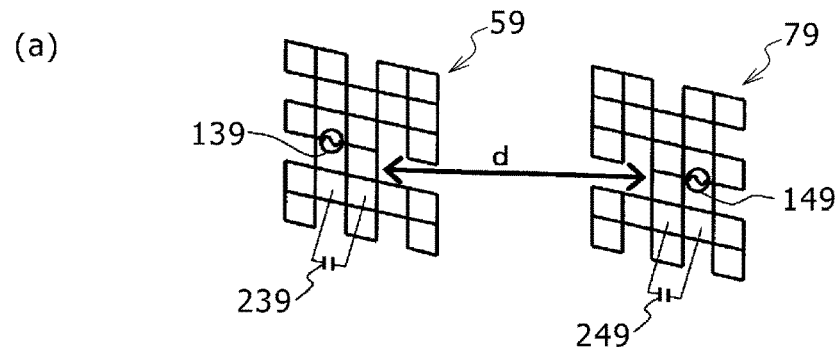
FIG. 13 is a diagram showing a first other typical configuration of a transmitter, a receiver, a power transmitting antenna, and a power receiving antenna which function as a radio power transmission apparatus according to a thirteenth embodiment of the present invention.
Figure 13:
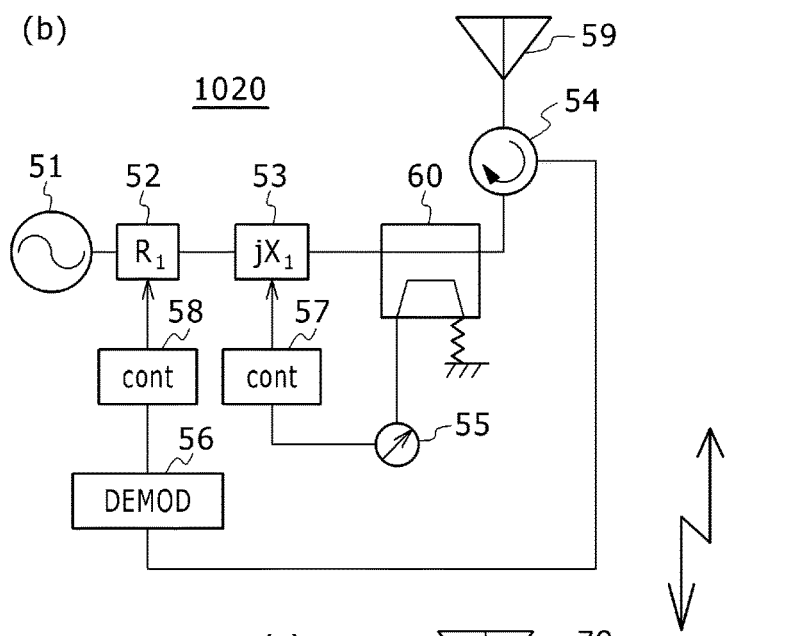
Figure 13:
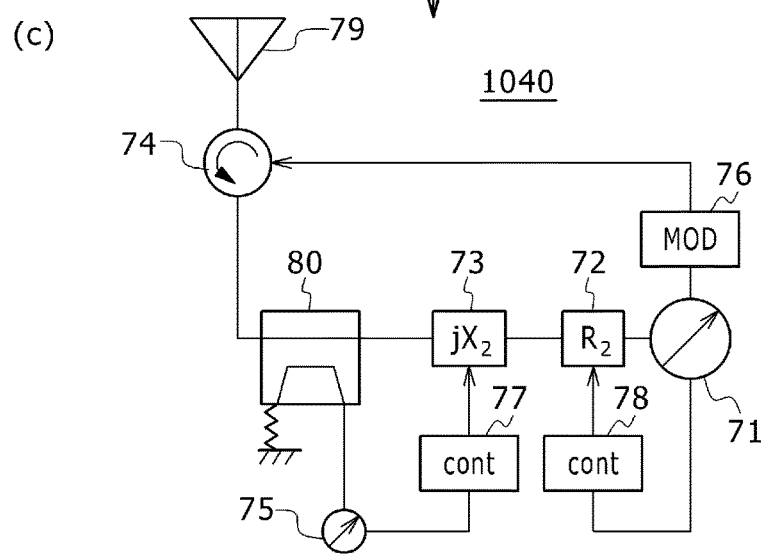

FIG. 13 is a diagram showing a first other typical configuration of a transmitter 1020, a receiver 1040, a power transmitting antenna 59, and a power receiving antenna 79 which function as a radio power transmission apparatus according to a thirteenth embodiment of the present invention. FIG. 13(a) shows the configurations of the power transmitting antenna 59 and the power receiving antenna 79.

FIG. 13(b) shows the configuration of the transmitter 1020 and FIG. 13(c) shows the configuration of the receiver 1040.

For the sake of explanatory convenience, the embodiment is explained in the following order: (b) the transmitter; (c) the receiver; and (a) the power transmitting antenna and the power receiving antenna.

Transmitter 1020

In FIG. 13(b), a variable transmitter characteristic impedance conversion circuit 52 is denoted by reference notation 'R1', a variable transmitter reactance circuit 53 is denoted by reference notation 'jX$_1$', a power transmitting demodulation circuit 56 is denoted by reference notation 'DEMOD', a first power transmitting control circuit 57 is denoted by reference notation 'cont', and a second power transmitting control circuit 58 is denoted by reference notation 'cont'.

In FIG. 13(b), the transmitter 1020 radiates high-frequency power generated by a power generation circuit 51 to the air through the variable transmitter characteristic impedance conversion circuit 52 and the variable transmitter reactance circuit 53 from the power transmitting circular polarized-wave antenna 59.

A power transmitting circulator 54 is provided between the power transmitting circular polarized-wave antenna 59 and the variable transmitter reactance circuit 53.

Then, part of power flowing from the power transmitting circular polarized-wave antenna 59 to the variable transmitter reactance circuit 53 is supplied to the power transmitting demodulation circuit 56.

The power transmitting demodulation circuit 56 supplies a demodulated output to the second power transmitting control circuit 58. In addition, the second power transmitting control circuit 58 controls the variable transmitter characteristic impedance conversion circuit 52.

In addition, a power transmitting directivity coupler 60 is provided between the variable transmitter reactance circuit 53 and the power transmitting circulator 54.

The power transmitting directivity coupler 60 delivers power generated by the power generation circuit 51 from the variable transmitter reactance circuit 53 to the power transmitting circulator 54.

In addition, the power transmitting directivity coupler 60 supplies part of power, which flows from the power transmitting circular polarized-wave antenna 59 to the variable transmitter reactance circuit 53, to the transmitted power measurement circuit 55. The transmitted power measurement circuit 55 supplies a measured output to the first power transmitting control circuit 57. In addition, the first power transmitting control circuit 57 controls the variable transmitter reactance circuit 53.

Receiver 1040

In FIG. 13(c), a variable receiver characteristic impedance conversion circuit 72 is denoted by reference notation 'R$_2$', a variable receiver reactance circuit 73 is denoted by reference notation 'jX$_2$', a power receiving modulation circuit 76 is denoted by reference notation 'MOD', a first power receiving control circuit 77 is denoted by reference notation 'cont', and a second power receiving control circuit 77 is denoted by reference notation 'cont'.

In the receiver 1040 shown in FIG. 13(c), a power receiving circular polarized-wave antenna 79 transfers captured (received) power to a load circuit 71 through the variable receiver characteristic impedance conversion circuit 72 and the variable receiver reactance circuit 73.

A power receiving circulator 74 is inserted into a position between the power receiving circular polarized-wave antenna 79 and the variable receiver reactance circuit 73.

A power receiving directivity coupler 80 is inserted into a position between the power receiving circulator 74 and the variable receiver reactance circuit 73.

In addition, power flowing from the power receiving circulator 74 to the variable receiver reactance circuit 73 is supplied to a received power measurement circuit 75. The received power measurement circuit 75 supplies a measured output to the first power receiving control circuit 77.

In addition, the first power receiving control circuit 77 controls the variable receiver reactance circuit 73.

The second power receiving control circuit 78 controls the variable receiver characteristic impedance conversion circuit 72 on the basis of a value of power consumed by the load circuit 71.

In addition, on the basis of the value of power consumed by the load circuit 71, in the power receiving circulator 74, the power receiving modulation circuit 76 modulates power captured by the power receiving circular polarized-wave antenna 79.

Other Configurations and Operations of the Transmitter 1020 and the Receiver 1040

In FIGS. 13(b) and 13(c), it is necessary to reduce the degrees of coupling of a power transmitting directivity coupler 60 and a power receiving directivity coupler 80 which are employed in the thirteenth embodiment to values reducing the effect on the efficiency of the power transmission from the transmitter 1020 to the receiver 1040. For example, a value in a range of −10 dB to −20 dB is used.

In addition, power is supplied to circuit elements inside the transmitter 1020 by a power generation circuit 51. By the same token, power is supplied to circuit elements inside the receiver 1040 by a load circuit 71.

In FIG. 13, for the purpose of preventing the figure from becoming complicated, lines for supplying power to the circuit elements are not shown.

Power Transmitting Antenna 59 and Power Receiving Antenna 79

In FIG. 13(a), the power transmitting antenna 59 and the power receiving antenna 79 each are configured by compounding distributed constant reactances and concentrated constant reactances. A distributed constant reactance is a reactance based on a set combining small rectangular conductors (reference numeral 300 in FIG. 7). A concentrated constant reactance is a reactance in which a transmitting loaded reactance 239 (a reactance element) and a receiving loaded reactance 249 (a reactance element) are loaded.

In addition, reference numerals 139 and 149 denote power supplying points of the power transmitting antenna 59 and the power receiving antenna 79, respectively.

In addition, reference notation d denotes a distance between the power transmitting antenna 59 and the power receiving antenna 79. It is desirable to set the distance d at a value equal to or smaller than half the wavelength of electromagnetic waves for transmitting power.

In FIG. 13(a), the number of sets of small rectangular conductors composing the power transmitting antenna 59 and the power receiving antenna 79 is expressed simply as a small value.

In this case, in FIG. 13(a), if the power transmitting antenna 59 and the power receiving antenna 79 are each designed to comprise 10×10 small rectangular conductors in the same way as antennas 9 and 29 which are shown in FIG. 7, antenna design simulation is carried out under the same conditions explained in the description of the structure of a circular polarized-wave antenna according to the seventh embodiment shown in FIG. 7.

In FIG. 13(a), however, the reactance elements 239 (249) are further loaded. The loading of the reactance elements 239 was not shown in the antennas 9 and 29 described earlier by referring to FIG. 7.

In this case, if the number of small rectangular conductors composing the antenna shown in FIG. 13(a) is assumed to be 10×10, the number of junction side candidates for small rectangular conductors for loading reactance elements is (10−1)×10×2.

Thus, for the total number of combinations of power supplying point positions of the antenna structure verified in a round-robin manner and the reactance loading positions, the number of cases of loading reactance elements is a product so that the total number of combination becomes a large number.

As described earlier, however, by using very-fast computer hardware and a very-fast computation algorithm in the computation of an electromagnetic field, by configuring from a number of rectangular conductors, a very fine structure can be brought about so that an antenna with loaded reactance elements can be designed. Thus, it is possible to invent a better antenna structure for carrying out both high-efficiency power transmission and stable control signal transmission.

General Operations of the Transmitter, the Receiver, and the Transmitting and Receiving Antennas In FIGS. 13 (a), 13 (b) and 13 (c), in accordance with the thirteenth embodiment, the imaginary part of the internal impedance of the transmitter 1020 is controlled by power reflected from the power transmitting circular polarized-wave antenna 59 whereas the imaginary part of the internal impedance of the receiver 1040 is controlled by power received from the power receiving circular polarized-wave antenna 79.

Because of the control, energy from the transmitter 1020 is supplied to the receiver 1040. The supplied energy is used to control the real part of the internal impedance of the receiver 1040 by utilizing the received-power value of the load circuit 71.

In addition, as for the real part of the internal impedance of the transmitter 1020, electromagnetic waves shared by the transmitter 1020 and the receiver 1040 are directly modulated by the power receiving modulation circuit 76 by using the received-power value of the load circuit 71. As a result, after modulated components appearing on the transmitter side have been reproduced by using the power transmitting demodulation circuit 56, they can be controlled by using the same power.

Thus, it is possible to concurrently control the imaginary and real parts of the internal impedance of each of the transmitter 1020 and the receiver 1040, the transmitter 1020 including the power generation circuit 51 and the power transmitting antenna 59, the receiver 1040 including the load circuit 71 and the power receiving antenna 79.

This control makes it possible to carry out high-efficiency power transmission using electromagnetic waves from the transmitter 1020 to the receiver 1040.

In addition, in accordance with the thirteenth embodiment, as described before, the power transmitting antenna 59 and the power receiving antenna 79 are configured by compounding distributed constant reactances and concentrated constant reactances. A distributed constant reactance is a reactance based on a set combining small rectangular conductors (reference numeral 300 in FIG. 7). A concentrated constant reactance is a reactance in which a transmitting loaded reactance elements 239 and 249 are loaded.

Because of a configuration including a concentrated constant reactance, it is possible to increase changes of the power transmission efficiency of the power transmitting and receiving operations for changes of the internal reactance of the transmitter 1020 and the receiver 1040. Thus, by controlling the real and imaginary parts of the internal impedance of the transmitter 1020 and the receiver 1040, it is possible to increase change of the power transmission efficiency between the transmitter and the receiver.

Fourteenth Embodiment: Second Other Configuration of the Radio Power Transmission Apparatus The following description explains a fourteenth embodiment implementing a second other configuration of an apparatus for carrying out radio power transmission.

Figure 14:
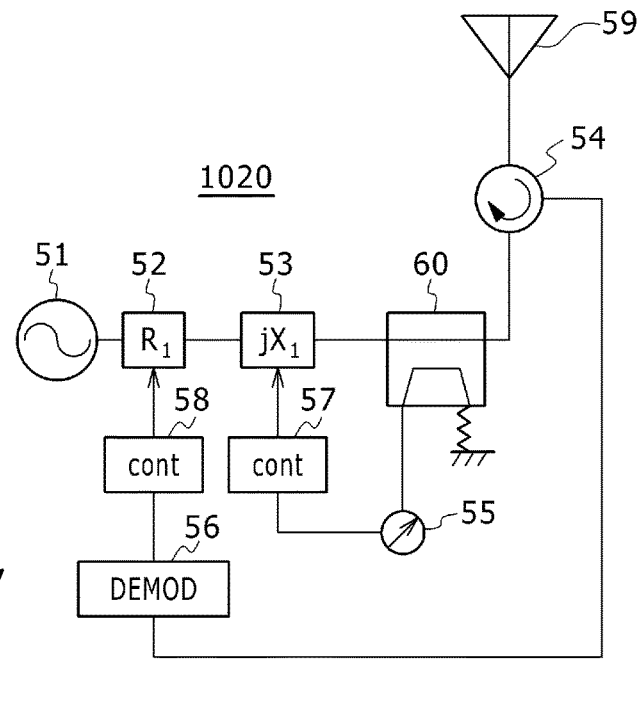
FIG. 14 is a diagram showing a second other typical configuration of a transmitter and a transceiver which function as a radio power transmission apparatus according to a fourteenth embodiment of the present invention.
Figure 14:
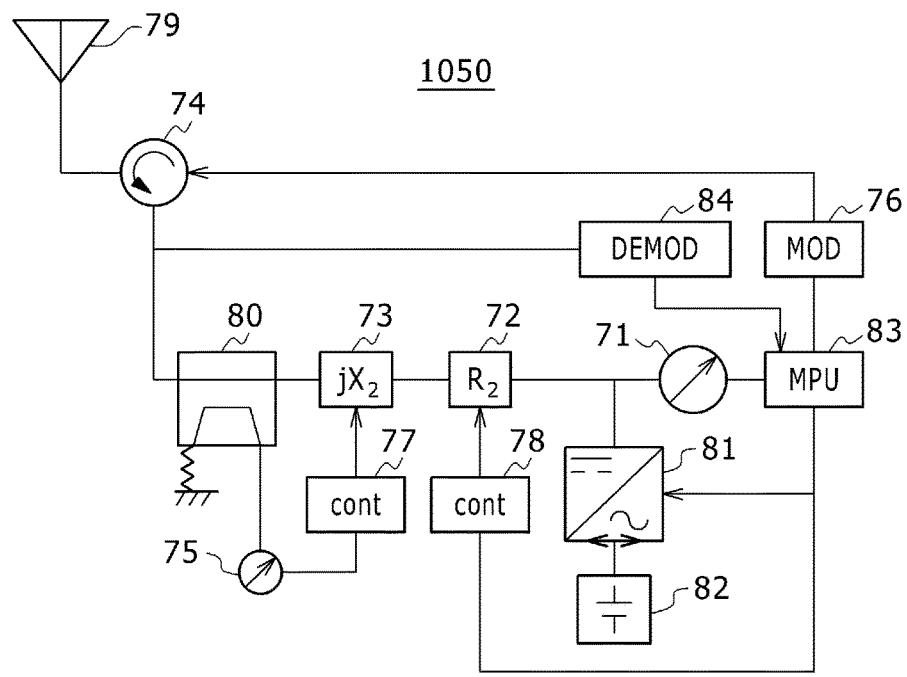

FIG. 14 is a diagram showing a second other typical configuration of a transmitter 1020 and a transceiver 1050 which function as a radio power transmission apparatus according to the fourteenth embodiment of the present invention. FIG. 14(a) shows the configuration of the transmitter 1020 and FIG. 14(b) shows the configuration of the transceiver 1050.

The fourteenth embodiment shown in FIG. 14 is different from the thirteenth embodiment shown in FIG. 13 in that the transceiver 1050 shown in FIG. 14 replaces the receiver 1040 shown in FIG. 13.

To put it concretely, the transceiver 1050 includes a rectification/inverter circuit 81 and a power accumulation battery 82, which are connected to each other to form a subordination circuit connected in parallel to the load circuit 71 employed in the receiver 1040.

In addition, a processor unit 83 is also included. The processor unit 83 is used for executing overall control on a rectification/inverter circuit 81, a second power receiving control circuit 77 and a power receiving modulation circuit 76. The second power receiving control circuit 77 is used for executing control to change the real part of the internal impedance.

In addition, a power receiving demodulation circuit 84 (a second demodulation circuit) is also included. The power receiving demodulation circuit 84 is used for demodulating a signal received from the power receiving circular polarized-wave antenna 79 through a power receiving circulator 74 and supplying the demodulated signal to the processor unit 83. The power transmitting demodulation circuit 56 in this configuration is also referred to as a first demodulation circuit.

Then, in this configuration, power generated from the rectification/inverter circuit 81 is radiated to the external air from the power receiving circular polarized-wave antenna 79 through the power receiving circulator 74.

In addition, the processor unit 83 determines whether received power exists by detecting power consumed by the load circuit 71. If power consumed by the load circuit 71 is detected, the processor unit 83 determines that received power exists. In addition, the processor unit 83 recognizes that a power receiving demand exists by detecting a signal from the power receiving demodulation circuit 84. In this case, the rectification/inverter circuit 81 enters a detection mode for converting power (AC power) received by the transceiver 1050 into DC power and stores the DC power in the power accumulation battery 82.

At that time, the power receiving modulation circuit 76 is used to output signal indicating a power receiving operation to an external destination.

In addition, if the consumed power of the load circuit 71 is recognized to indicate that received power does not exist, the processor unit 83 puts the rectification/inverter circuit 81 in an inverter mode to convert DC power accumulated in the power accumulation battery 82 into AC power and output the AC power to an external destination from the power receiving circular polarized-wave antenna 79 through the power receiving circulator 74.

At that time, the power receiving modulation circuit 76 is used to output a signal indicating a demand for a power receiving operation to an external destination through the power receiving circular polarized-wave antenna 79.

In accordance with the fourteenth embodiment, power received by a remote destination can be again radiated to an external space from the remote destination.

In FIG. 14(b), the power receiving demodulation circuit 84 (the second demodulation circuit) is denoted by reference notation 'DEMOD' whereas the processor unit 83 is denoted by reference notation 'MPU'.

In addition, the transmitter 1020 shown in FIG. 14(a) has the same configuration as that shown in FIG. 13(b). In the transceiver 1050 shown in FIG. 14(b), elements other than those explained above are denoted by the same reference numerals as those shown in FIG. 13(c). In addition, their configurations are basically identical with those shown in FIG. 13(c). Thus, duplications of explanations can be avoided.

Fifteenth Embodiment: Third Other Configuration of the Radio Power Transmission Apparatus The following description explains a fifteenth embodiment implementing a third other configuration of an apparatus for carrying out radio power transmission.

Figure 15:
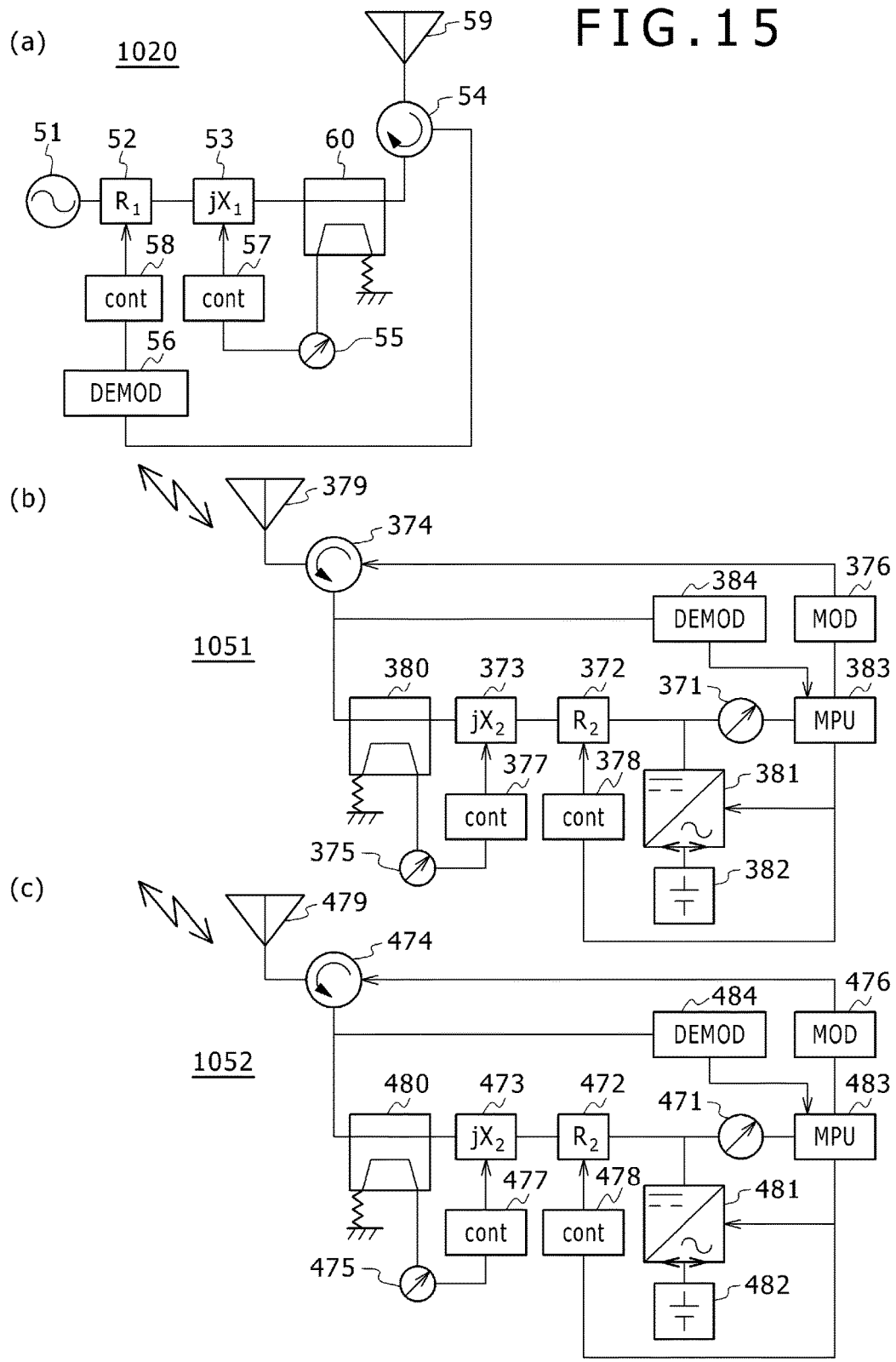
FIG. 15 is a diagram showing a third other typical configuration of transceivers and a transmitter which function as a radio power transmission apparatus according to a fifteenth embodiment of the present invention.

FIG. 15 is a diagram showing a third other typical configuration of a transmitter 1020 and a transceivers 1051 and 1052 which function as a radio power transmission apparatus according to a fifteenth embodiment of the present invention. FIG. 15(a) shows the configuration of the transmitter 1020 whereas FIG. 15(b) shows the configuration of the first transceiver 1051 and FIG. 15(c) shows the configuration of the configuration of the second transceiver 1052.

The fifteenth embodiment shown in FIG. 15 is different from the fourteenth embodiment shown in FIG. 14 in that, even though the configurations of the transceivers 1051 and 1052 shown in FIG. 15 are identical with the configuration of the transceiver 1050 shown in FIG. 14, the fifteenth embodiment shown in FIG. 15 employs two transceivers 1051 and 1052 forming a radio power transmission system in conjunction with the transmitters 1020.

The configuration elements included in the transmitter 1020 shown in FIG. 15 are denoted by the same reference numerals as those shown in FIG. 14 and their configurations are basically identical with those shown in FIG. 14. Thus, duplications of explanations can be avoided.

The transmitter 1020 and the first transceiver 1051 form a pair for carrying out radio power transmission. The relation between the real and imaginary parts of the impedance of the equipment forming the pair for carrying out radio power transmission is controlled to give a maximum power transmission efficiency.

The second transceiver 1052 is set to give a minimum efficiency of power transmission carried out by a pair of the transmitter and the transceiver 1052. At that time, the relations between the real and imaginary parts of the impedances of the transmitter 1020 and the first transceiver 1051 are controlled to give a maximum power transmission efficiency.

In addition, the transmitter 1020 and the second transceiver 1052 form a pair for carrying out radio power transmission. The relation between the real and imaginary parts of the impedance of the equipment forming the pair for carrying out radio power transmission is controlled to give a maximum power transmission efficiency.

In addition, in conjunction with the transmitter 1020, the first transceiver 1051 forms a pair for carrying out radio power transmission. The first transceiver 1051 is set to give a minimum efficiency of power transmission carried out by the pair. At that time, the relations between the real and imaginary parts of the impedances of the transmitter 1020 and the second transceiver 1052 are controlled to give a maximum power transmission efficiency.

As described above, in accordance with the fifteenth embodiment, it is possible to transmit power from one transmitter 1020 to a plurality of transceivers 1051 and 1052.

Sixteenth Embodiment: Fourth Other Configuration of the Radio Power Transmission Apparatus The following description explains a sixteenth embodiment implementing a fourth other configuration of an apparatus for carrying out radio power transmission.

Figure 16:
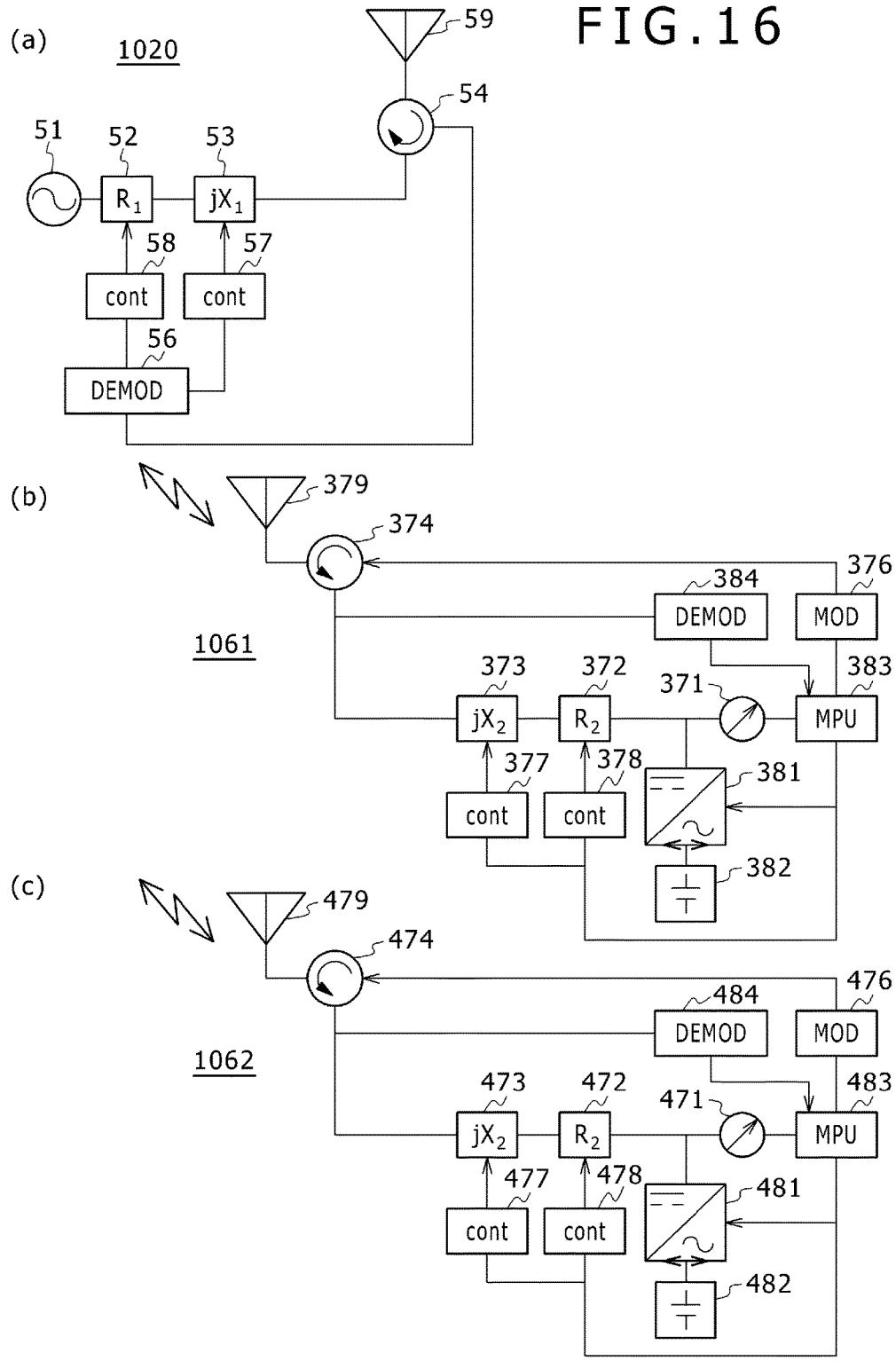
FIG. 16 is a diagram showing a fourth other typical configuration of transceivers and a transmitter which function as a radio power transmission apparatus according to a sixteenth embodiment of the present invention.

FIG. 16 is a diagram showing a fourth other typical configuration of a transmitter 1020 and a transceivers 1061 and 1062 which function as a radio power transmission apparatus according to a sixteenth embodiment of the present invention. FIG. 16(*a*) shows the configuration of the transmitter 1020 whereas FIG. 16(*b*) shows the configuration of the transceiver 1061 and FIG. 16(*c*) shows the configuration of the configuration of the second transceiver 1062.

The sixteenth embodiment shown in FIG. 16 is different from the fifteenth embodiment shown in FIG. 15 in that, in place of the transceivers 1051 and 1052, the transceivers 1061 and 1062 having a different configuration are employed. The transmitter 1020 shown in FIG. 16 has the same configuration as shown in FIG. 15.

The transceivers 1061 and 1062 are different from the transceivers 1051 and 1052 in that the transceivers 1061 and 1062 do not include the directivity couplers 380 and 480 and the received-power measurement circuits 375 and 475. Instead, variable receiver reactance circuits 373 and 473 are controlled by first control circuits 377 and 477 in accordance with instructions issued by processor units 383 and 483 by using power consumed by the load circuits 371 and 471, respectively.

In accordance with the sixteenth embodiment, the control of the variable receiver reactance circuits 373 and 473 is executed by using power consumed by the load circuits 371 and 471, respectively. Thus, it is possible to increase the efficiency of power transmission from the transmitter 1020 to the transceivers 1061 and 1062. In addition, it is possible to shorten the period between a point right after the power transmission and a high-efficiency transmission state.

The other configuration elements included in the transmitter 1020 shown in FIG. 16 are denoted by the same reference numerals as those shown in FIG. 15 and their configurations are basically identical with those shown in FIG. 15. Thus, duplications of explanations can be avoided.

Seventeenth Embodiment: Fifth Other Configuration of the Radio Power Transmission Apparatus The following description explains a seventeenth embodiment implementing a fifth other configuration of an apparatus for carrying out radio power transmission. The seventeenth embodiment implements a typical configuration wherein the transmitter 1020 and the transceivers 1051 and 1052 which are used in the fifteenth embodiment shown in FIG. 15 are used and power is transmitted by adopting a relay technique. The seventh embodiment also includes a transceiver 1053 as an additional transceiver.

Figure 17:
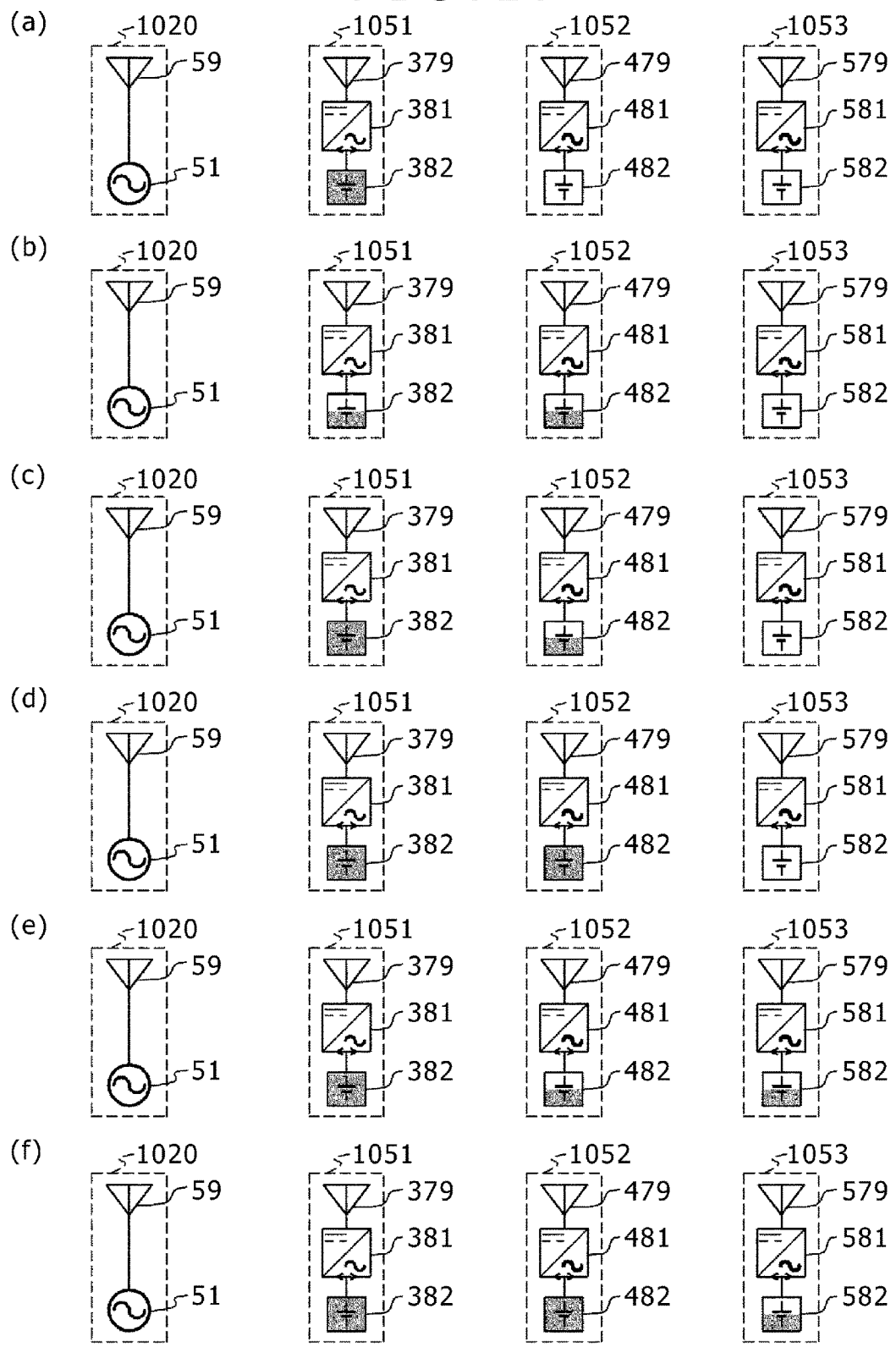
FIG. 17 is a diagram showing the configuration of a relay-type power remote-destination transmission system using a radio power transmission apparatus according to a seventeenth embodiment of the present invention and a state in which power is transmitted sequentially.

FIG. 17 is a diagram showing the configuration of a relay-type power remote-destination transmission system using a radio power transmission apparatus according to a seventeenth embodiment of the present invention and a state in which power is transmitted sequentially. FIG. 17(*a*) shows a state in which a power accumulation battery of a first transceiver has been fully charged. FIG. 17(*b*) shows a state in which half the power accumulated in the power accumulation battery of the first transceiver is being transferred to a second transceiver. FIG. 17(*c*) shows a state in which power has been again accumulated in the power accumulation battery of the first transceiver. FIG. 17(*d*) shows a state in which a power accumulation battery of the second transceiver has been fully charged. FIG. 17(*e*) shows a state in which half the power accumulated in the power accumulation battery of the second transceiver is being transferred to a third transceiver. FIG. 17(*f*) shows a state in which power has been again accumulated in the power accumulation battery of the second transceiver.

FIGS. 17(*a*) to 17(*f*) show states at different times in the lapse of time.

The configuration shown in FIG. 17 includes the transmitter 1020 having the power transmitting antenna 59 and the power generation circuit 51 in accordance with the fifteenth embodiment.

In addition, the configuration also includes the first transceiver 1051, the second transceiver 1052, and the third transceiver 1053 which are located at certain intervals. The first transceiver 1051 comprises a power receiving antenna 379, a rectification/inverter circuit 381, and a power accumulation battery 382. By the same token, the second transceiver 1052 comprises a power receiving antenna 479, a rectification/inverter circuit 481, and a power accumulation battery 482. In the same way, the third transceiver 1053 comprises a power receiving antenna 579, a rectification/inverter circuit 581, and a power accumulation battery 582. The above three power receiving antennas, the rectification/inverter circuits, and the power accumulation batteries have the same configuration, respectively.

First Stage

FIG. 17 for the configuration described above shows changes of the states of one transmitter and three transceivers along the time axis with attention particularly paid to amounts of power accumulated in the power accumulation batteries.

First of all, the transmitter 1020 and the first transceiver 1051 adjust values of the real and imaginary parts of their internal impedances in order to increase the efficiency of the power transmission.

In addition, the transmitter 1020 and the second transceiver 1052 adjust values of the real and imaginary parts of their internal impedances in order to decrease the efficiency of the power transmission.

In addition, the transmitter 1020 and the third transceiver 1053 adjust values of the real and imaginary parts of their internal impedances in order to decrease the efficiency of the power transmission.

These adjustments are carried out by using signals generated and reproduced by modulation and demodulation circuits included in the transmitter 1020 and the transceivers 1051, 1052 and 1053. The adjustments are carried out between the pieces of equipment by adoption of a radio technique.

Second Stage

When the power accumulation battery 382 of the first transceiver 1051 is perceived to have been fully charged (as shown in FIG. 17(*a*)), the first transceiver 1051 transmits a power transmission start signal by attaching the ID (Identification) of the second transceiver 1052 thereto. The ID has been stored in advance in the processor unit. The hatched black box of the power accumulation battery 382 indicates the fully charged state of the power accumulation battery 382.

The second transceiver 1052 receives the power transmission start signal including its own ID attached thereto. Then, the first transceiver 1051 and the second transceiver 1052 adjust the values of the real and imaginary parts of their respective internal impedances in order to increase the efficiency of the power transmission.

In addition, when the third transceiver 1053 receives the power transmission start signal including the ID different from its own ID, the transmitter 1020 and the third transceiver 1053 adjust the values of the real and imaginary parts of their respective internal impedances in order to decrease the efficiency of power transmission with other equipment.

As a result, half the power accumulated in the power accumulation battery 382 of the first transceiver 1051 is transferred to the second transceiver 1052 (as shown in FIG. 17(*b*)). A half hatched black box of the power accumulation battery 382 or the power accumulation battery 482 indicates a state being charged to half the power accumulation capacity.

Third Stage

If the first transceiver 1051 recognizes a state in which the amount of power transferred from the first transceiver 1051 to the second transceiver 1052 is smaller than a prescribed value determined in advance, the first transceiver 1051 transmits a power transmission start signal by attaching the ID of the transmitter thereto.

The transmitter 1020 receives the power transmission start signal including its own ID attached thereto. Then, the transmitter 1020 and the first transceiver 1051 adjust the values of the real and imaginary parts of their respective internal impedances in order to increase the efficiency of the power transmission.

In addition, when the second transceiver 1052 and the third transceiver 1053 receives the power transmission start signal including the ID different from their own ID, the second transceiver 1052 and the third transceiver 1053 adjust the values of the real and imaginary parts of their respective internal impedances in order to decrease the efficiency of power transmission with other equipment.

As a result, power is again accumulated into the power accumulation battery 382 of the first transceiver 1051 (as shown in FIG. 17(*c*))

In addition, when the power accumulation battery 382 of the first transceiver 1051 is perceived to have been fully charged, the same operations are repeated.

Fourth Stage

Afterward, when the power accumulation battery 482 of the second transceiver 1052 is perceived to have been fully charged (as shown in FIG. 17(*d*)), the second transceiver 1052 transmits a power transmission start signal by attaching the ID (Identification) of the third transceiver 1053 thereto. The ID has been stored in advance in the processor unit.

The third transceiver 1053 receives the power transmission start signal including its own ID attached thereto. Then, the second transceiver 1052 and the third transceiver 1053 adjust the values of the real and imaginary parts of their respective internal impedances in order to increase the efficiency of the power transmission.

In addition, when the transmitter 1020 and the first transceiver 1051 receive the power transmission start signal including the ID different from their own ID, the transmitter 1020 and the first transceiver 1051 adjust the values of the real and imaginary parts of their respective internal impedances in order to decrease the efficiency of power transmission with other equipment.

As a result, half the power accumulated in the power accumulation battery 482 of the second transceiver 1052 is transferred to the third transceiver 1053 (as shown in FIG. 17(*e*)).

Fifth Stage

In addition, if the second transceiver 1052 recognizes a state in which the amount of power transferred from the second transceiver 1052 to the third transceiver 1053 is smaller than a prescribed value determined in advance, the second transceiver 1052 transmits a power transmission start signal by attaching the ID of the first transceiver 1051 thereto.

The first transceiver 1051 receives the power transmission start signal including its own ID attached thereto. Then, the first transceiver 1051 and the second transceiver 1052 adjust the values of the real and imaginary parts of their respective internal impedances in order to increase the efficiency of the power transmission.

In addition, when the transmitter 1020 and the third transceiver 1053 receive the power transmission start signal including the ID different from their own ID, the transmitter 1020 and the third transceiver 1053 adjust the values of the real and imaginary parts of their respective internal impedances in order to decrease the efficiency of power transmission with other equipment. As a result, power is again accumulated into the power accumulation battery 482 of the second transceiver 1052 (as shown in FIG. 17(*f*))

Sixth Stage

The operations described above are carried out repeatedly till eventually the power accumulation battery of each transceiver is half charged. This state is shown in none of the figures.

In accordance with the seventeenth embodiment, for a plurality of remotely arranged transceivers for carrying out power transmissions, power can be transmitted to the remote transceivers by adoption of a relay technique.

In the seventeenth embodiment, the transceivers are the transceivers 1051 and 1052 according to the fifteenth embodiment. Even if the transceivers according to the fourteenth and sixteenth embodiments are used, however, power can be transferred by adoption of the same relay technique.

Eighteenth Embodiment: Radio Backup
Power/Information Transmission Network

Next, the following description explains an eighteenth embodiment of the present invention. This embodiment implements a radio backup power/information transmission network and its system. The network uses radio power transmission apparatus according to the embodiments explained before.

Figure 18:
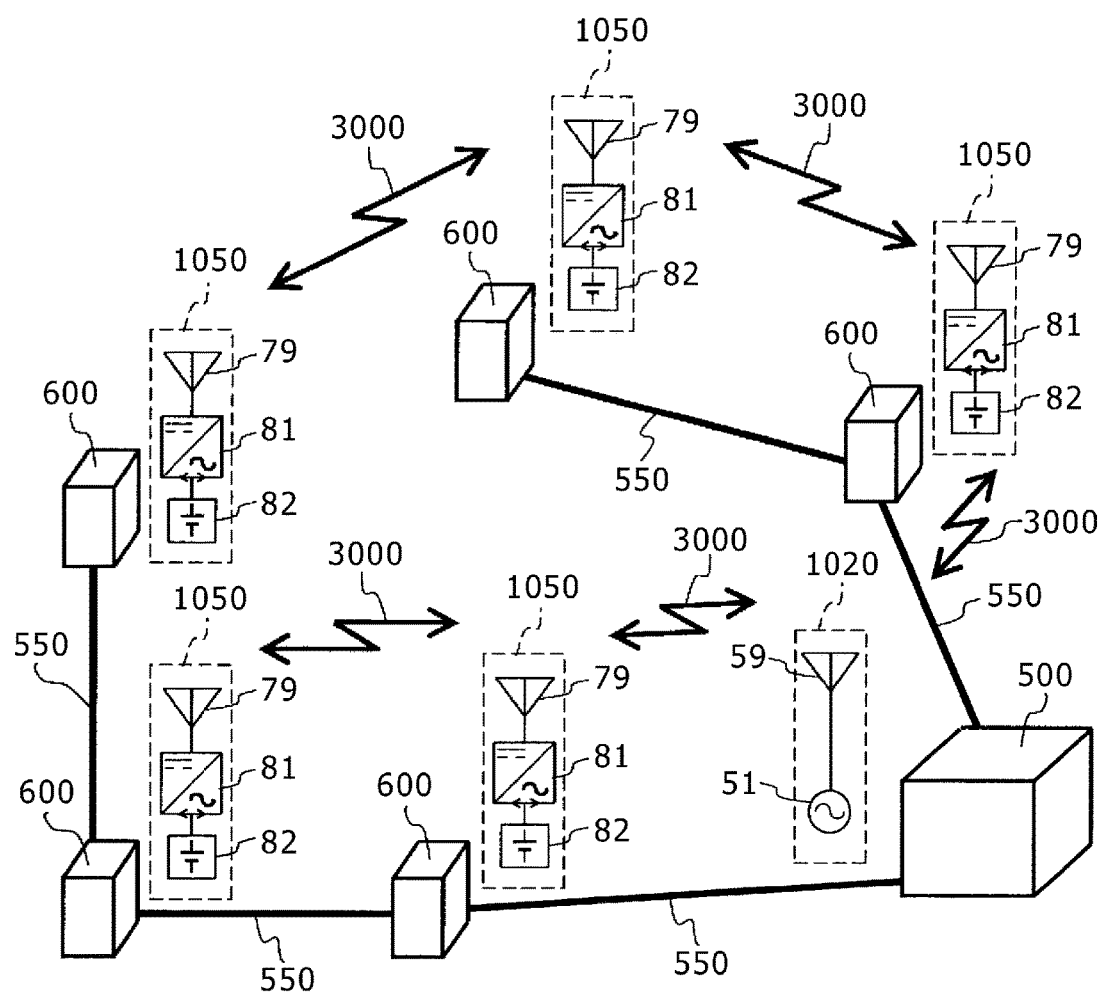
FIG. 18 is a diagram showing a radio backup power/information transmission network using a radio power transmission apparatus according to an eighteenth embodiment of the present invention and a typical system configuration of the network.

FIG. 18 is a diagram showing a radio backup power/ information transmission network using a radio power transmission apparatus according to an eighteenth embodiment of the present invention and a typical system configuration of the network.

In FIG. 18, a parent apparatus 500 and a plurality of child apparatus 600 are each a power supplying apparatus including a radio power transmission apparatus for supplying power and information.

One parent apparatus 500 for transmitting power and information is connected to a plurality of child apparatus 600 by a plurality of information/power transmission cables 550.

Some child apparatus 600 may be directly connected to a parent apparatus 500 by an information/power transmission cable 550. Other child apparatus 600 may be connected to a parent apparatus 500 by an information/power transmission cable 550 indirectly through another child apparatus 600.

In the parent apparatus 500, there is set a transmitter 1020 of the radio power transmission apparatus. The transmitter 1020 includes a power transmitting antenna 59 and a power generation circuit 51 which are explained in the description of the fourteenth embodiment.

In the child apparatus 600, there is set the transceiver 1050 of the radio power transmission apparatus. The transceiver 1050 includes a power receiving antenna 79, a rectification/inverter circuit 81 and a power accumulation battery 82 which are explained in the description of the fourteenth embodiment.

In the eighteenth embodiment, information and power are transmitted between the parent apparatus 500 and the child apparatus 600 which are connected to each other by an information/power transmission cable 550 serving as wire communication means.

In addition, it is possible to provide a configuration in which power can be transmitted by adoption of a radio technique between the parent apparatus 500 and the child apparatus 600 and among a plurality of child apparatus 600.

A plurality of information/power transmission cables 550 serving as wire communication means form the power/ information transmission network (the wire network 550). On the other hand, a plurality of radio power transmissions 3000 form a radio network (3000). It is possible to configure a system and a network wherein the radio network backs up the power/information transmission network (the wire network).

Thus, when a failure occurs on a information/power transmission cable 550 so that wire transmission of information and power between the parent apparatus 500 and the child apparatus 600 is halted, the power transmission is backed up by the transmitter 1020 and the transceiver 1050 which use the radio power transmission (radio power network) 3000.

In addition, it is possible to provide also a communication function for communications using a radio line for control signal communications implemented between the transmitter 1020 and the transceiver 1050 which are included in the power transmission apparatus. It is thus possible to back up power and information by using the radio backup power/ information transmission network for implementing power transmissions and communications.

In the eighteenth embodiment described above, the transceiver is the transceiver 1050 according to the fourteenth embodiment. However, the transceivers according to the fifteenth to seventeenth embodiments can also be used for transmitting power by adoption of a relay technique.

Nineteenth Embodiment: Radio Backup Power Supplying Network

Next, as a nineteenth embodiment, the following description explains a radio backup power supplying network using radio power transmission apparatus according to the embodiments and explains a typical system configuration of the network.

Figure 19:
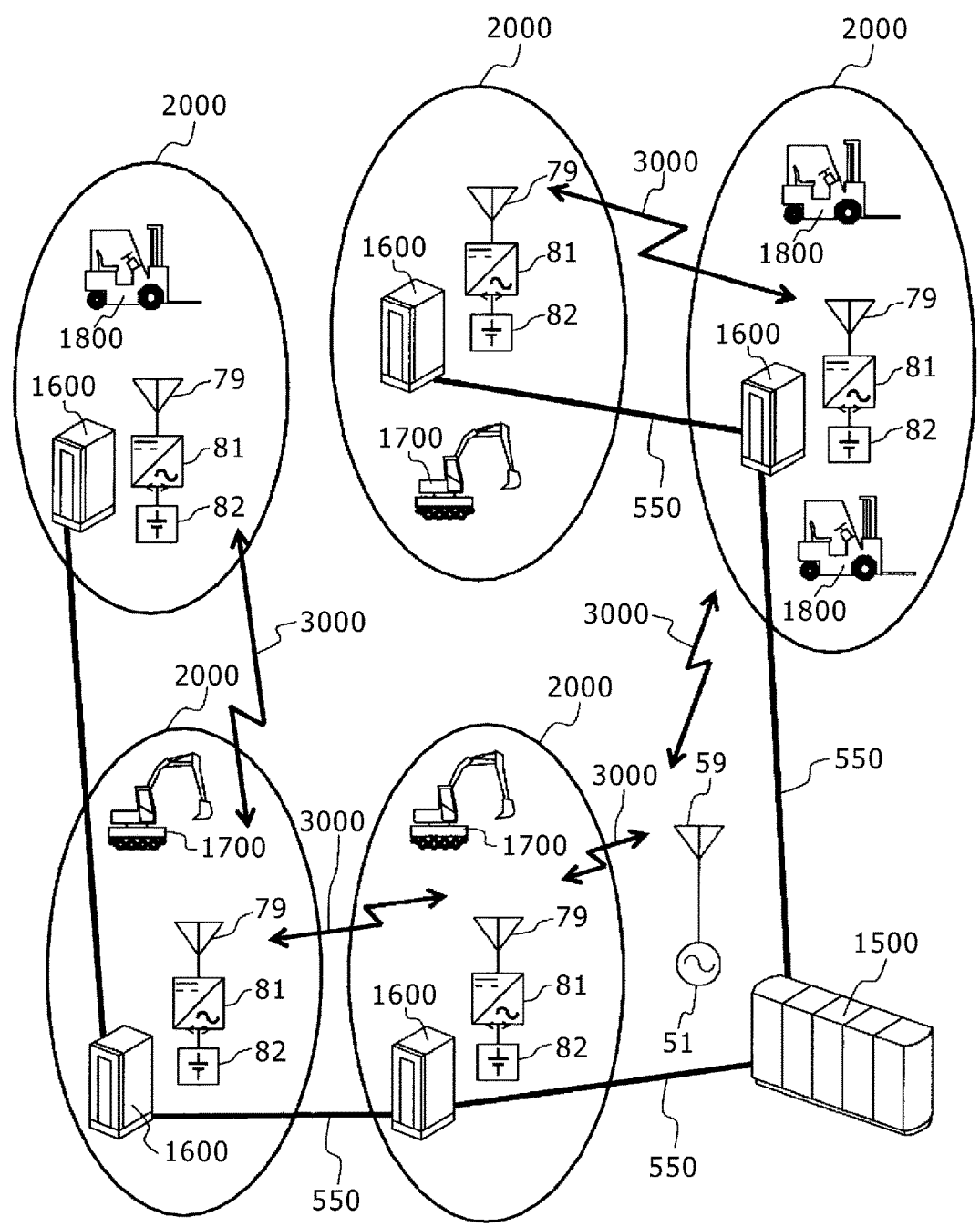
FIG. 19 is a diagram showing a radio backup power supplying network using a radio power transmission apparatus according to a nineteenth embodiment of the present invention and a typical system configuration of the network.

FIG. 19 is a diagram showing a radio backup power supplying network using a radio power transmission apparatus according to a nineteenth embodiment of the present invention and a typical system configuration of the network.

In FIG. 19, an overall management apparatus 1500 and a plurality of power supplying apparatus 1600 are each provided with a radio power transmission apparatus, serving as a power supplying apparatus for transmitting power and information.

One overall management apparatus 1500 is connected to a plurality of power supplying apparatus 1600 by a plurality of information/power transmission cables 550.

Some power supplying apparatus 1600 may be directly connected to an overall management apparatus 1500 by an information/power transmission cable 550. Other power supplying apparatus 1600 may be connected to an overall management apparatus 1500 by an information/power transmission cable 550 indirectly through another power supplying apparatus 1600.

In the surrounding of the power supplying apparatus 1600, an operation area 2000 of a power shovel apparatus 1700 and a fork lift apparatus 1800 are assured.

In addition, the power shovel apparatus 1700 and the fork lift apparatus 1800 supply necessary power at any time from the power supplying apparatus 1600 and carries out mutual transmission of information to the overall management apparatus 1500 through the power supplying apparatus 1600.

The overall management apparatus 1500 includes a transmitter serving as a radio power transmission apparatus comprising a power transmitting antenna 59, and a power generation circuit 51 which are provided by the fourteenth or eighteenth embodiment.

The power supplying apparatus 1600 includes a transmitter serving as a radio power transmission apparatus comprising a power receiving antenna 79, a rectification/inverter circuit 81, and a power accumulation battery 82 which are provided by the fourteenth or eighteenth embodiment.

The operation area 2000 desirably has a range of several meters as an area for implementing stable radio power transmission. To expand the operation area of equipment to a range of several ten meters, a solution is devised as follows. A plurality of radio power transmission apparatus connected in a subordination connection are given between adjacent power supplying apparatus 1600. The radio power transmission apparatus each include a power transmitting antenna 59 and a power generation circuit 51. However, this configuration is not shown in the figure.

In the nineteenth embodiment, it is possible to carry out mutual transmissions of information and power by using the information/power transmission cable 550 between the overall management apparatus 1500 and the power supplying apparatus 1600.

When a failure occurs on a information/power transmission cable 550 so that wire transmission of information and power between the overall management apparatus 1500 and the power supplying apparatus 1600 is halted, the power transmission is backed up by the transmitter 1020 (59, 51) and the transceiver 1050 (79, 81, 82) which use the radio power transmission (radio power network) 3000.

In addition, it is possible to provide also a communication function for communications using a radio line for control signal communications implemented between the transmitter 1020 and the transceiver 1050 which are included in the power transmission apparatus. It is thus possible to provide a backup using the radio network (3000) of the wire network (550) for implementing power transmissions and communications.

However, the power supplying capability of the power transmission by the radio power network (3000) is small in comparison with that of the information/power transmission cable (550). Thus, it is desirable that equipment in the operation area of the power supplying apparatus 1600 cut off from the overall management apparatus 1500 by a wire due to a broken information/power transmission cable 550 moves to the operation area of another power supplying apparatus 1600 connected to the overall management apparatus 1500 by the wire network after receiving enough power from the radio power network (3000).

Other Embodiments

Embodiments of the present invention have been described so far by referring to diagrams. However, the present invention is by no means limited to the embodiments and their modified versions. Design changes and the like are allowed as long as the changes are within a range not deviating from essentials of the present invention. Some of the examples of design changes are shown below.

Adjustment of Real Parts of Internal Impedances of Transmitters and Receivers

In the first embodiment shown in FIG. 1, the real part of the internal impedance of the transmitter 20 and the receiver 40 are adjusted by using the variable transmitter characteristic impedance conversion circuits 2 and receiver characteristic impedance conversion circuit 22, respectively. In spite of the characteristic impedance concept, from a view point of adjusting the real part of the internal impedance, a circuit resistance concept is also good. That is to say, from the view point of the real part of the impedance, the characteristic impedance and the circuit resistance hardly make any differences.

Thus, a circuit of a view point of adjusting the circuit resistance serving as the real part of the internal impedance of the transmitter 20 or the receiver 40 can also be used.

At that time, the real part of the internal impedance of the transmitter 20 or the receiver 40 is adjusted by using a variable circuit resistance conversion circuit. Specifically, the real part of the internal impedance of the transmitter 20 or the receiver 40 is adjusted by using a transmitter variable circuit resistance conversion circuit (2) or a receiver variable circuit resistance conversion circuit (22), respectively.

In addition, it is by no means limited to the configuration shown in FIG. 1. It is also possible to use a variable circuit resistance conversion circuit as the variable characteristic impedance conversion circuits 2, 22, and 42 shown in FIGS. 2 to 6 and the variable characteristic impedance conversion circuits 52, 72, 372, and 472 shown in FIGS. 13 to 16.

In addition, if a variable circuit resistance conversion circuit is used in place of a variable characteristic impedance conversion circuit, items corresponding to characteristic impedances in the time charts shown in FIG. 8 and the flowcharts shown in FIGS. 9 and 10 are replaced by circuit resistances.

Adjustment by a Plurality of Steps

The flowchart shown in FIG. 9 for the transmitter 20 includes a step to change the reactance value of the transmitter 20 in a step-by-step way. That is to say, at the step S1005, the reactance value is changed by 1 step of a predetermined value. Then, the procedure of the subsequent flow is executed and, if the change is considered to be improper, the reactance value is further changed by 1 step of the predetermined value when the flow goes back to the step S1005. In this way, the transmitter 20 adopts a method for optimizing the reactance value by carrying out these operations repeatedly.

However, the transmitter 20 may adopt another method for changing the reactance value by a plurality of such steps at one time. Such another method is adopted if, by 1 step of the predetermined value, the change for the optimization is determined to be too small.

By the same token, at the step S1011 of the flowchart shown in FIG. 9, the characteristic-impedance value is changed in a step-by-step way. Also in this case, the transmitter 20 may adopt another method for changing the characteristic-impedance value by a plurality of such steps at one time. Such another method is adopted if, by 1 step of the predetermined value, the change for the optimization is determined to be too small.

In addition, the flowchart shown in FIG. 10 for the receiver 40, the step S2005 is a process of changing the reactance value by 1 step of a predetermined value. By the same token, at the step S2011, the characteristic-impedance value is changed in a step-by-step way. Also in this case, the receiver 40 may adopt another method for changing the characteristic-impedance value by a plurality of such steps at one time. Such another method is adopted if, by 1 step of the predetermined value, the change for the optimization is determined to be too small.

In addition, the change by a plurality of steps may cause the control direction to be inverted frequently at the steps S1008, S1014, S2008, and S2014. In this case, the one-step change technique may be adopted again or a half-step change technique is adopted. In this way, it is possible to adopt a method of varying the size of the change in order to shorten the convergence time and achieve a high degree of precision at the same time.

Antenna Types

In the first embodiment shown in FIG. 1, an embodiment implementing a circular polarized-wave antenna is explained. That is to say, the antennas are the power transmitting circular polarized-wave antenna 9 and the power receiving circular polarized-wave antenna 29.

In addition, in the fourth embodiment shown in FIG. 4, an embodiment implementing a linear polarized-wave antenna is explained. That is to say, the antennas are the power transmitting linear polarized-wave antenna 19 and the power receiving linear polarized-wave antenna 39.

However, the antennas are by no means limited to these antennas. A linear polarized-wave antenna can be used in the first embodiment shown in FIG. 1 whereas a circular polarized-wave antenna can be used in the fourth embodiment shown in FIG. 4. In addition, it is possible to use an antenna other than the linear polarized-wave antenna and the circular polarized-wave antenna.

Small Rectangular Conductors Composing an Antenna

FIG. 7 shows a model of a typical configuration in which, as described before, the number of small rectangular conductors composing an antenna is 10×10. However, the number of small rectangular conductors composing the configuration of an antenna is by no means limited to 10×10. For example, one side of a compartment may exceed 10 to give a conductor count of 20×20. In addition, if the computation performance of the computer hardware is increased and the computation software is improved, the number of small rectangular conductors composing an antenna can be set at 100×100. It is also possible to adopt a configuration in which the number of small rectangular conductors composing an antenna is set at a greater number. If the number of compartments composing the antenna is increased, it is possible to carry out simulation by well approximating a circular or polygonal antenna.

In addition, the 10×10 small rectangular conductors composing an antenna can be arranged to form a shape other than a rectangle. For example, it is possible to carry out simulation by arranging 10×20 small rectangular conductors composing an antenna to form the shape of an oblong.

In addition, the small rectangular conductors composing an antenna do not have to be a rectangle such as a square. For example, the small rectangular conductor can be a triangle or a hexagon. As another example, the small rectangular conductor can be a combination of a triangle and a square.

In addition, the shape of the antenna does not have to be planar. The shape can also be three dimensional or an uneven planar structure.

In addition, materials composing the antenna can be different materials placed at portions of a plane or an uneven structure.

By adoption of such a method, the number of antenna configuration types can be increased so that it is quite within the bounds of possibility that an antenna having characteristics more proper for the purpose can be selected.

Loaded Reactance

FIG. 13(a) shows typical loading of a reactance element in each of the antennas. That is to say, the reactance elements serve as a power transmitting loaded reactance 239 and a power receiving loaded reactance 249 in the power transmitting antenna 59 and the power receiving antenna 79, respectively.

However, the number of reactance elements is by no means limited to one. That is to say, reactance elements may be loaded into a plurality of locations. In addition, the reactance elements may have different static capacitances and different frequency characteristics.

If such reactance elements are loaded, it is quite within the bounds of possibility that an antenna having characteristics more proper for the purpose can be selected.

Relation Between Radio Network and Wire Network

In the eighth embodiment shown in FIG. 18 and the nineteenth embodiment shown in FIG. 19, radio power transmission 3000 is provided on a path on which an information/power transmission cable 550 is set. If a failure occurs on the information/power transmission cable 550 in such a typical configuration, the radio power transmission 3000 provided on the same path serves as a backup. Thus, the typical configuration is a configuration in which the wire network (550) composed of the information/power transmission cable 550 has about the same configuration as the radio network (3000) composed of the radio power transmission 3000.

However, it is not always necessary that the wire network (550) has about the same configuration as the radio network (3000).

For example, the parent apparatus 500 (shown in FIG. 18) and the overall management apparatus 1500 (shown in FIG. 19) are provided at about a circular center of an object area and a plurality of information/power transmission cables 550 are laid out in a state of radiation. At their ends or in their middles, a child apparatus 600 and a power supplying apparatus 1600 are placed to form a wire network (550). In addition, as for a plurality of radio power transmissions 3000, the placed child apparatus 600 and the placed power supplying apparatus 1600 are provided on paths having circular shapes or concentric circular shapes to form a radio network (3000). In this case, the wire network and the radio network have shapes which are phase-geometrically different. However, by using the radio network, it is possible to back up a failure occurring on the wire network.

Equipment Receiving Power by a Radio Technique

In the nineteenth embodiment shown in FIG. 19, the power shovel apparatus 1700 and the fork lift apparatus 1800 receive power from the power supplying apparatus 1600. However, equipment receiving such power is by no means limited to the power shovel apparatus 1700 and the fork lift apparatus 1800. For example, the equipment includes a crane and a trencher. In addition, equipment receiving such power is by no means limited to equipment used in a work field. The equipment also includes agricultural equipment such as a tractor, a combine, a cultivator and a rice planter which are used in agriculture. As described above, various kinds of equipment receive power by adopting the radio technique.

Frequency of Radio Power Transmission

In the embodiments shown in FIGS. 1 to 6 and FIGS. 13 to 16, the radio power transmission is carried out at a frequency determined in advance.

However, there is also a method in which the radio frequency used in the radio power transmission can be changed in accordance with the environment and the equipment serving as the object of the radio power transmission.

In addition, if a plurality of apparatus receive radio transmissions, the frequency can be changed in accordance with the receiving apparatus.

By selecting a plurality of frequencies as described above, it is quite within the bounds of possibility that a highly reliable radio power transmission proper for the environment and the noise situation at that time can be carried out.

Supplements for the Invention and the Embodiments

The following description explains power transmission means using magnetic resonance based on electromagnetic waves for noncontact transmissions according to the present invention and the embodiments and explains technologies related to the means.

Power Transmission Using Magnetic Resonance

A system including a power transmitting antenna and a power receiving antenna is described in terms of a mutual impedance representing the capability of transmitting power between the two antennas and a self impedance representing the input impedance of each of the antennas.

When the distance between the transceiver and the receiver is a value in an order which cannot be neglected in comparison with the wavelength, an electric field and a magnetic field coexist between the power transmitting antenna and the power receiving antenna to a degree which cannot be neglected. Thus, the mutual impedance between the antennas exists with a value in such an order that the imaginary part and the real part cannot be mutually neglected.

Therefore, the impedance obtained when seeing the power transmitting antenna side from the power generation circuit side coexists with a value in such an order that the imaginary part and the real part cannot be mutually neglected. On the other hand, the impedance obtained when seeing the power receiving antenna side from the load circuit side coexists with a value in such an order that the imaginary part and the real part cannot be mutually neglected.

In addition, power of electromagnetic waves also includes an energy expressed in terms of a real part and an imaginary part.

The real part of power transmitted by electromagnetic waves is radioactive energy. The energy is propagated by an electric field and a magnetic field as electromagnetic waves. The energy per volume unit decreases with the distance. The energy propagation using this phenomenon is power transmission using general electromagnetic waves.

On the other hand, the imaginary part of power transmitted by electromagnetic waves is non-radioactive energy. This energy is not radiated to the vicinities of the power transmitting antenna and the power receiving antenna, but accumulated.

When the distance between the power transmitting antenna and the power receiving antenna is in a range approximately shorter than the wavelength λ of the electromagnetic phenomenon (the distance is for example λ/2, and in this case, distance back and forth between the antennas is λ), however, the energy represented by the imaginary part of the power has mutual interactions as the non-radioactive energy. The energy is not radiated to the vicinities of the power transmitting antenna and the power receiving antenna, but accumulated.

Then, as the impedances of the power transmitting antenna and the power receiving antenna match each other, an effect similar to a resonance phenomenon causes an electromagnetic energy to propagate from the power transmitting antenna to the power receiving antenna. Since the energy is not radioactive, the energy does not flow to the vicinities of the power transmitting antenna and the power receiving antenna, but propagated. Thus, the power transmission is efficient.

This phenomenon is referred to as power transmission due to magnetic resonance.

As described above, this phenomenon is limited to a range of distances shorter than the wavelength of the electromagnetic phenomenon. The distance is the distance between the power transmitting antenna and the power receiving antenna. At these distances, however, it is possible to carry out power transmission at an efficiency much higher than the power transmission using ordinary electromagnetic waves. As described before, the matching of the impedances of the power transmitting antenna and the power receiving antenna is an important condition.

Thus, the maximum efficiency of power transmission from the power transmitting side to the power receiving side can be implemented by dynamically controlling the internal impedances of the power generation circuit and the load circuit, and by matching impedances of the real and imaginary parts of the power transmitting circuit, including the power generation circuit and the power transmitting antenna, and the power receiving circuit, including the load circuit and the power receiving antenna.

Points of Interest in Embodiments

The problem remaining to be solved is what means is to be used to dynamically control the imaginary and real parts of the internal impedances of the power transmitting antenna and the power receiving antenna. By paying attention to the physical properties of these imaginary and real parts, however, solution means becomes obvious.

That is to say, the imaginary part of the internal impedance corresponds to the imaginary part of the electromagnetic energy transmitted in the power transmission. Thus, as described before, it is possible to make the energy related to the imaginary part locally exist in the vicinities of the power transmitting antenna and the power receiving antenna.

If high-efficiency power transmission from the power transmitting side to the power receiving side is being implemented, the imaginary energy can be made to locally exist in the vicinities of the power transmitting antenna and the power receiving antenna and the spreading of the energy to the external space is considered to be controlled. Thus, the control of the imaginary part of the internal impedance on the power transmitting side can be executed to make energy variations between the power generation circuit and the power transmitting antenna minimum.

By the same token, the control of the imaginary part of the internal impedance on the power receiving side can be executed to make energy variations between the load circuit and the power receiving antenna minimum.

That is to say, the control of the imaginary part of the internal impedances on the power transmitting side and the power receiving side can be executed separately. Thus, it is possible to expect power transmission from the power transmitting side to the power receiving side to a certain degree.

As described above, by controlling the imaginary parts of the internal impedances, power transmission from the power transmitting side to the power receiving side can be carried out to a certain degree. Thus, preparations can be all made to provide means for transmitting the value of received power of the load circuit to the power transmitting side by using this supplied power.

Technologies Applied to Embodiments

Since the electric field and the magnetic field are generated to coexist, the real part of the energy of the electromagnetic waves is spread to the external space. It is impossible to expect that they locally exist in the vicinities of the power transmitting antenna and the power receiving antenna.

Thus, in order to maximize the power received by the load circuit, it is necessary to control the real parts of the internal impedances of the power transmitting side and the power receiving side, that is, the real parts of the internal impedances of the power generation circuit and the load circuit (with the variable characteristic impedance conversion circuits 2 and 22 shown in FIG. 1), by directly using the state of the same received power.

The imaginary parts of the internal impedances on the power transmitting side and the power receiving side are controlled (with the variable reactance circuits 3 and 23 shown in FIG. 1). By controlling the imaginary parts, usable power exists on the power receiving side and the power transmitting side and the power receiving side are joined to each other by the imaginary energy of the electromagnetic waves. Thus, the power obtained in the same electromagnetic waves on the power receiving side is used to measure the received-power value (with the received power measurement circuit 25 shown in FIG. 1).

Then, the power value is coded. The electromagnetic waves flowing from the power transmitting side to the power receiving side are modulated (by the power receiving modulation circuit 26 shown in FIG. 1) on the power receiving side by using the code. Thus, the state of the modulation immediately appears also on the power transmitting side through the imaginary energy of the electromagnetic waves.

By demodulating this modulation on the power transmitting side (by using the power transmitting demodulation circuit 6 shown in FIG. 1), the received power value of the load circuit can be known so that it is possible to dynamically control the real part of the internal impedance of the power transmitting side, that is, the power generation circuit (denoted by reference numeral 1 in FIG. 1), by using the received power value (the variable transmitter characteristic impedance conversion circuit 2 shown in FIG. 1). The real part of the internal impedance of the power receiving side, that is, the load circuit, can be dynamically controlled by using the received power value received on the power receiving side as the power value of the load circuit as it is.

DESCRIPTION OF REFERENCE NUMBERS

1, 51: Power generation circuit
2, 52: Variable characteristic impedance conversion circuit or variable transmitter characteristic impedance conversion circuit (variable circuit resistance conversion circuit or variable transmitter circuit resistance conversion circuit)
3, 53: Variable reactance circuit or variable transmitter reactance circuit
4, 54: Power transmitting circulator
5, 55: Transmitted power measurement circuit
6, 56: Power transmitting demodulation circuit (First demodulation circuit)
7, 57: First power transmitting control circuit
8, 58: Second power transmitting control circuit
9, 59: Power transmitting circular polarized-wave antenna
10, 60: Power transmitting directivity coupler
14: Second power transmitting directivity coupler
19: Power transmitting linear polarized-wave antenna
20, 1020: Transmitter
21, 41, 71, 371, 471: Load circuit
22, 42, 72, 372, 472: Variable characteristic impedance conversion circuit or variable receiver characteristic impedance conversion circuit (variable circuit resistance conversion circuit or variable receiver circuit resistance conversion circuit)
23, 43, 73, 373, 473: Variable reactance circuit or variable receiver reactance circuit
24, 44, 74, 374, 474: Power receiving circulator
25, 45, 75, 375, 475: Received power measurement circuit
26, 46, 76, 376, 476: Power receiving modulation circuit (Modulation circuit)
27, 47, 77, 377, 477: First power receiving control circuit
28, 48, 78, 378, 478: Second power receiving control circuit
29, 49, 79, 379, 479, 579: Power receiving circular polarized-wave antenna
30, 50, 80, 380, 480: Power receiving directivity coupler
31, 84, 384, 484: Power receiving demodulation circuit (Second demodulation circuit)
32, 82, 382, 482, 582: Power accumulation battery
33: Rectification circuit
34: Second power receiving directivity coupler
39: Power receiving linear polarized-wave antenna
40, 70, 1040: Receiver
1050, 1051, 1052, 1053, 1061, 1062: Transceiver
81, 381, 481, 581: Rectification/inverter circuit
83, 383, 483: Processor unit
100: Image display system
101, 202: Radio power supplying apparatus
109, 139: Transmitting antenna power supplying point
110: Image display apparatus
111: Display
149, 209: Receiving antenna power supplying point
200: Mobile-body power supplying system
201: Mobile body
222: Vehicle wheel
239: Power transmitting loaded reactance (Reactance device)
249: Power receiving loaded reactance (Reactance device)
300: Small rectangular conductor
500: Parent apparatus
550: Information/power transmission cable
600: Child apparatus
1500: Overall management apparatus
1600: Power supplying apparatus
1700: Power shovel apparatus
1800: Fork lift apparatus
2000: Operation area
3000: Radio power transmission (Radio network)

The invention claimed is:

1. A radio power transmission apparatus comprising:
a transmitter having a power transmitting antenna for transmitting electromagnetic waves and at least one power transmitting circuit; and
a receiver having a power receiving antenna for receiving electromagnetic waves and at least one power receiving circuit, wherein:
on the basis of power reflected from the power transmitting antenna, the power transmitting circuit executes control of an imaginary part of an internal impedance of the power transmitting circuit to change a circuit reactance of the power transmitting circuit in order to control an imaginary part of power of the electromagnetic waves to be transmitted; and
on the basis of a value of power received by the receiver through the power receiving antenna, the value of power transmitted from the receiver to the transmitter by using electromagnetic waves of power transmission, the power transmitting circuit executes control of a real part of the internal impedance of the power transmitting circuit to change a circuit resistance of the power transmitting circuit or a characteristic impedance of the power transmitting circuit in order to control the real part of power of the electromagnetic waves to be transmitted.

2. A radio power transmission apparatus according to claim 1, wherein:
the power transmitting circuit and the power receiving circuit both have a variable reactance circuit and a variable circuit resistance conversion circuit or a variable characteristic impedance conversion circuit;
control of the circuit reactance of the power transmitting circuit and the circuit reactance of the power receiving circuit is executed by the variable reactance circuit;
control of the circuit resistance of the power transmitting circuit and the circuit resistance of the power receiving circuit or control of the characteristic impedance of the power transmitting circuit and the characteristic impedance of the power receiving circuit is executed by the variable circuit resistance conversion circuit or the variable characteristic impedance conversion circuit respectively.

3. A radio power transmission apparatus according to claim 2, wherein:
the power transmitting circuit and the power receiving circuit carry out their respective circuit-reactance control and circuit-resistance control or characteristic-impedance control along a time axis.

4. A radio power transmission apparatus according to claim 2, wherein:
the power transmitting circuit and the power receiving circuit carry out their respective circuit-reactance control and circuit-resistance control or characteristic-impedance control, the circuit-reactance control being executed prior to the circuit-resistance control or the characteristic-impedance control.

5. A radio power transmission apparatus according to claim 1, wherein:
the power transmitting circuit has a first demodulation circuit;
the power receiving circuit has a modulation circuit and a second demodulation circuit;
on the basis of power received by the power receiving circuit, the modulation circuit modulates electromagnetic waves of the power transmission;
the first or second demodulation circuit demodulates a modulated signal of electromagnetic waves of the power transmission; and
on the basis of a signal demodulated by the first or second demodulation circuit, the circuit resistance or the characteristic impedance of the power transmitting circuit and the power receiving circuit is controlled.

6. A radio power transmission apparatus according to claim 1, wherein:
the power transmitting antenna and the power receiving antenna are each a circular polarized-wave antenna or a linear polarized-wave antenna.

7. A radio power transmission apparatus according to claim 1, wherein:
the power transmitting antenna and the power receiving antenna are each formed as an assembly of small rectangular conductors.

8. A radio power transmission apparatus according to claim 1, wherein:
a reactance device is loaded into each of the power transmitting antenna and the power receiving antenna.

9. A radio power transmission apparatus according to claim 1, wherein:
the power receiving circuit further includes a rectification circuit and a power accumulation battery; and
received power is accumulated in the power accumulation battery through the rectification circuit.

10. A radio power transmission apparatus according to claim 1, wherein:
a number of power receiving circuits of the at least one power receiving circuit is greater than a number of power transmitting circuits of the at least one power transmitting circuit.

11. An image display system comprising:
a radio power supplying apparatus which is an assembly of the transmitter of the radio power transmission apparatus according to claim 1; and
an image display apparatus having the receiver of the radio power transmission apparatus according to claim 1.

12. A mobile-body power supplying system comprising:
a radio power supplying apparatus having the transmitter of the radio power transmission apparatus according to claim 1; and
a mobile body having the receiver of the radio power transmission apparatus according to claim 1.

13. A radio power transmission apparatus comprising:
a transmitter having a power transmitting antenna for transmitting electromagnetic waves and a power transmitting circuit;
a transceiver having a power transmitting/receiving antenna for transmitting and receiving electromagnetic waves and a power transmitting/receiving circuit;
a rectification circuit;
an inverter circuit; and
a power accumulation battery, wherein:
on the basis of power reflected from the power transmitting antenna, the power transmitting circuit executes control of an imaginary part of an internal impedance of the power transmitting circuit to change a circuit reactance of the power transmitting circuit in order to control an imaginary part of power of the electromagnetic waves to be transmitted; and
on the basis of a value of power received by the transceiver from the power transmitting/receiving antenna, the value of power transmitted from the receiver to the transmitter by using electromagnetic waves of power transmission, the power transmitting circuit executes control of a real part of the internal impedance of the power transmitting circuit to change a circuit resistance of the power transmitting circuit or a characteristic impedance of the power transmitting circuit in order to control the real part of power of the electromagnetic waves to be transmitted;
power received by the power transmitting/receiving circuit is converted by the rectification circuit into DC power;
the DC power is accumulated in the power accumulation battery;
the DC power accumulated in the power accumulation battery is converted by the inverter into AC power; and
the AC power is output by the power transmitting/receiving circuit to external space through the power transmitting/receiving antenna.

14. A radio power transmission apparatus according to claim 13, wherein:
the power transmitting circuit and the power transmitting/receiving circuit both have a variable reactance circuit and a variable circuit resistance conversion circuit or a variable characteristic impedance conversion circuit;
control of the circuit reactance of the power transmitting circuit and the circuit reactance of the power transmitting/receiving circuit is executed by the variable reactance circuit;
control of the circuit resistance of the power transmitting circuit and the circuit resistance of the power transmitting/receiving circuit or control of the characteristic impedance of the power transmitting circuit and the characteristic impedance of the power transmitting/receiving circuit is executed by the variable circuit resistance conversion circuit or the variable characteristic impedance conversion circuit respectively.

15. A radio backup power network, comprising:
a plurality of power supplying apparatus, each power supplying apparatus having the radio power transmission apparatus according to claim 13;

wherein the plurality of power supplying apparatus are connected to each other by wire cables; and wherein the plurality of power supplying apparatus exchange power and information with each other by adoption of a radio technique.

16. A radio backup power network according to claim 15, wherein:

the plurality of power supplying apparatus supply power to equipment operating in an operation area.

\* \* \* \* \*